United States Patent [19]
Bell et al.

[11] 3,928,380
[45] Dec. 23, 1975

[54] 1,1'-SPIROBIS(CYCLOPENTA-[4,5-C]PYRROLES)

[75] Inventors: Malcolm R. Bell; Rudolf Oesterlin, both of Rensselaer, N.Y.

[73] Assignee: Sterling Drug Inc., New York, N.Y.

[22] Filed: Mar. 29, 1973

[21] Appl. No.: 346,005

[52] U.S. Cl. .......... 260/326.9; 260/247; 260/247.1; 260/247.2 A; 260/293.61; 260/295; 260/326.25; 260/326.5 B; 260/326.5 D; 260/326.5 G; 260/326.62; 260/326.63; 424/246; 424/263; 424/267; 424/274
[51] Int. Cl.² .................................. C07D 209/02
[58] Field of Search..... 260/326.9, 326.25, 326.5 D, 260/326.5 G

[56] References Cited
UNITED STATES PATENTS
3,567,361   3/1971   Vail ......................... 260/326.25 X Primary Examiner—Richard J. Gallagher
Attorney, Agent, or Firm—William G. Webb; B. W. Wyatt

[57] ABSTRACT 2,4,5,6-Tetrahydrocyclopenta[c]pyrrole-4-carboxamide and 4-thiocarboxamide derivatives have anti-secretory and antiulcer activity and are prepared by acid hydrolysis or thiohydrolysis of the corresponding 2,4,5,6-tetrahydrocyclopenta[c]pyrrole-4-carbonitriles or, in the case of the thiocarboxamides, by reaction of the 4-carboxamide either with ammonia/hydrogen sulfide or with phosphorus pentasulfide.

3 Claims, No Drawings

1,1'-SPIROBIS(CYCLOPENTA-[4,5-C]PYRROLES)

This invention relates to 2,4,5,6-tetrahydrocyclopenta[c]pyrrole-4-carboxamides and 4-thiocarboxamides, which are useful as anti-secretory and anti-ulcer agents and which have the formula I:

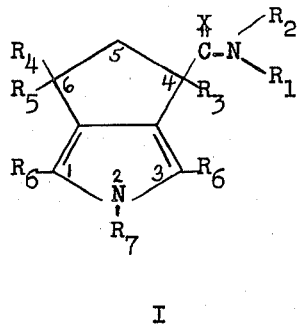

I where X is O or S; each of $R_1$ and $R_2$ is hydrogen or lower-alkyl; each of $R_3$, $R_4$ and $R_5$ is hydrogen or methyl; both $R_6$ groups are simultaneously hydrogen, formyl (CHO), phenyl-lower-alkyl, hydroxymethyl, carboxy, carbo-lower-alkoxy or lower-alkyl; and $R_7$ is hydrogen, lower-alkyl, lower-alkenyl, di-lower-alkylamino-lower-alkyl, morpholino-lower-alkyl, 1-pyrrolidyl-lower-alkyl, 1-piperidyl-lower-alkyl, carbo-lower-alkoxy-lower-alkyl, carboxy-lower-alkyl, carboxamido-lower-alkyl, thiocarboxamido-lower-alkyl, lower-alkoxy-lower-alkyl, hydroxy-lower-alkyl, lower-alkylthio-lower-alkyl, cycloalkyl, cycloalkyl-lower-alkyl, 2- or 3-pyridyl, phenyl, phenyl-lower-alkyl, thienyl, or divalent-lower-alkylene having its valences on different carbon atoms and joining two of the 2,4,5,6-tetrahydrocyclopenta[c]pyrrole moieties together, and wherein the phenyl or phenyl-lower-alkyl groups can be further substituted in the phenyl nucleus by from one to three members of the group consisting of lower-alkyl, lower-alkoxy, halogen (including fluorine, bromine and chlorine), hydroxy, methylenedioxy, trifluoromethyl, lower-alkanoylamino, amino, di-lower-alkylamino, carboxylic, carboxamido, carbo-lower-alkoxy, lower-alkylmercapto, lower-alkylsulfinyl, lower-alkylsulfonyl, nitro, or sulfamoyl.

Particularly preferred compounds within the ambit of formula I are those where X is O; $R_1$ and $R_2$ are each hydrogen; each of $R_3$, $R_4$, $R_5$ and $R_6$ is methyl; and $R_7$ is lower-alkyl or phenyl.

As used herein the terms "lower-alkyl" and "lower-alkoxy" means saturated, monovalent, aliphatic radicals, including straight or branched-chain radicals, of from one to four carbon atoms as illustrated by, but not limited to, methyl, ethyl, propyl, isopropyl, butyl, sec.-butyl, isobutyl, methoxy, ethoxy, propoxy, isopropoxy, butoxy, isobutoxy, and the like.

As used herein the term "cycloalkyl" means saturated, carbocyclic groups containing from three to six ring carbon atoms and having a total of five to ten carbon atoms, as illustrated by, but not limited to, cyclopropyl, cyclobutyl, 2-methylcyclobutyl, cyclohexyl, and the like.

As used herein the term "lower-alkenyl" means monovalent, aliphatic radicals of from three to six carbon atoms which contain at least one double bond, and are either straight or branched-chain as illustrated by, but not limited to, 1-(2-propenyl), 1-(1-propenyl), 1-(3-methyl-2-propenyl), 1-(1,3-dimethyl-2-propenyl), 1-(2-hexenyl), and the like.

As used herein, the term "lower-alkylene" means divalent, aliphatic radicals, including straight or branched-chain radicals, of from two to eight carbon atoms, and having its valences on differnt carbon atoms as illustrated by, but not limited to, 1,2-ethylene, 1,4-butylene, 1,6-hexylene, 3-methyl-1,5-pentylene, 1,8-octylene, and the like.

The compounds of formula I where X is O; $R_1$ and $R_2$ are each hydrogen; and $R_3$, $R_4$, $R_5$, $R_6$ and $R_7$ have the meanings given above are prepared by acid hydrolysis of the corresponding 2,4,5,6-tetrahydrocyclopenta[c]pyrrole-4-carbonitriles having the formula II:

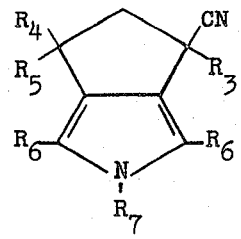

II where $R_3$, $R_4$, $R_5$ and $R_6$ have the meanings given above, and $R_7$, in addition to the various meanings given above, represents cyano-lower-alkyl. The reaction is carried out in an acid medium, for example, phosphoric acid, polyphosphoric acid or aqueous sulfuric acid at a temperature from 0°C. to around 70°C. During the reaction, the nitrile group in the compounds of formula II where $R_7$ is cyano-lower-alkyl is hydrolyzed simultaneously with the nitrile group attached to the 4-position of the 2,4,5,6-tetrahydrocyclopenta[c]pyrrole to thus produce compounds of formula I where $R_7$ is carboxamide-lower-alkyl, and the above-described procedure constitutes a preferred method of preparing the latter compounds.

The compounds of formula I where X is S; $R_1$ and $R_2$ are each hydrogen; and $R_3$, $R_4$, $R_5$, $R_6$ and $R_7$ have the meanings given above are preferably prepared by thiohydrolysis of the nitriles of formula II using the procedure of Karrer et al., Helv. Chim. Acta 28, 820 (1945) which involves reacting the nitrile with a saturated solution of ammonia and hydrogen sulfide in an organic solvent, preferably a lower-alkanol, at room temperature. Alternatively, the reaction can be carried out under pressure in an autoclave at a temperature from 150°–160°C. using the procedure described by Ralston et al., J. Org. Chem. 4, 68 (1939). As in the case of the hydrolysis of the compounds of formula II to those of formula I where X is O, thiohydrolysis of the compounds of formula II where $R_7$ is cyano-lower-alkyl affords the compounds of formula I where $R_7$ is thiocarboxamido-lower-alkyl, and the above-described procedure constitutes a preferred method of preparing the latter compounds.

Alternatively, the compounds of formula I where X is S are prepared by reaction of the corresponding compounds where X is O with phosphorus pentasulfide. The reaction is carried out by heating the reactants directly either with or without a solvent. Preferred solvents, when used, are benzene, toluene, xylene, dioxane and the like.

The compounds of formula I where R₇ is lower-alkyl, di-lower-alkylamino-lower-alkyl, morpholino-lower-alkyl, 1-pyrrolidyl-lower-alkyl, 1-piperidyl-lower-alkyl, cycloalkyl or cycloalkyl-lower-alkyl can also be prepared by reaction of the corresponding compounds where R₇ is hydrogen with a strong base, for example alkali metal hydrides or alkali metal amides, in an inert organic solvent, for example dimethylsulfoxide, dioxane, dimethylformamide, tetrahydrofuran, dibutyl ether, and the like, and reaction of the resulting salt with an appropriate alkylating agent, R₇X, where X is the anion of a strong mineral acid, for example a hydrogen halide or sulfuric acid, and R₇ has the meanings given above. The reaction is preferably carried out at low temperatures, i.e. from 0°C. to about 40°C.

The compounds of formula I where R₇ is lower-alkenyl are preferably prepared by Hofmann elimination of a tertiary amine from a compound of formula I where R₇ is di-lower-alkylamino-lower-alkyl, morpholino-lower-alkyl, 1-pyrrolidyl-lower-alkyl or 1-piperidyl-lower-alkyl. The method comprises converting the tertiary amine to a quaternary ammonium salt by reaction of the amine with an ester of a strong inorganic acid, e.g. a lower-alkyl halide or a di-lower-alkyl sulfate, and reacting the quaternary salt with silver oxide, preferably in an aqueous medium to effect conversion of the quaternary salt to the corresponding ammonium hydroxide, which spontaneously decomposes in an aqueous medium at ambient temperature and to the N-lower-alkenyl-substituted compound of formula I and a tertiary amine. It is preferred to use a dimethylamino-lower-alkyl-substituted compound of formula I as starting material and a methyl halide or dimethyl sulfate as quaternizing agent.

The compounds of formula I where R₁ and/or R₂ are lower-alkyl and R₇ is other than hydrogen are prepared by reacting the corresponding carboxamides where either one or both of R₁ or R₂ is hydrogen with a strong base, for example an alkali metal hydride or an alkali metal amide, followed by reaction of the resulting salt with an alkylating agent, for example a lower-alkyl halide or a di-lower-alkyl sulfate. Preparation of the compounds where both R₁ and R₂ are lower-alkyl is best effected by stepwise alkylation of the carboxamide, that is alkylation of the compounds where both R₁ and R₂ are hydrogen using one mole of a strong base and a one mole of an alkylating agent followed by a second alkylation of the resulting N-lower-alkylcarboxamide where one of R₁ and R₂ is lower-alkyl. The reaction takes place under much more vigorous conditions involving use of higher reaction temperatures, i.e. from about 50°C. to about 150°C., and longer reaction times than the above-described method for alkylation at the pyrrole nitrogen atom, which takes place at lower temperatures and shorter reaction times. The reaction is carried out in an inert organic solvent, for example dimethylsulfoxide, dioxane, dimethylformamide, tetrahydrofuran, dibutyl ether, and the like.

The compounds of formula I where each R₆ group is hydroxymethyl, are prepared by reduction, with an alkali metal borohydride, of the corresponding compounds of formula I where R₆ is formyl. The reaction is carried out in an inert organic solvent, for example lower-alkanols, dioxane, diethyl ether, and the like. The reaction generally takes place at ambient temperature, although elevated temperatures up to the boiling point of the solvent can be used to expedite the reaction. The method is represented by the equation:

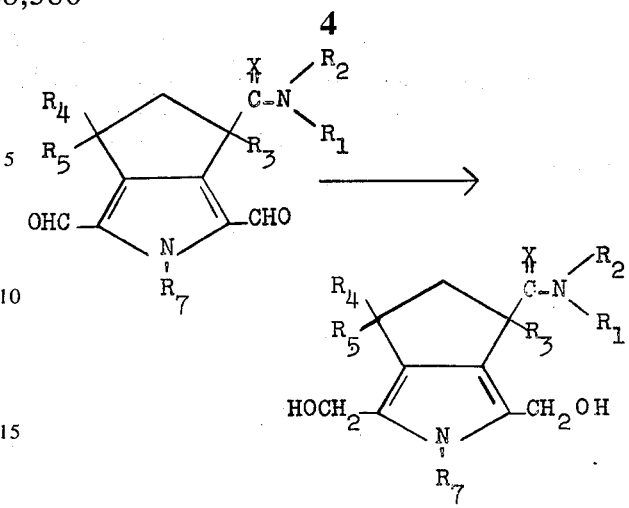

where R₁, R₂, R₃, R₄, R₅, R₇, and X have the meanings given above.

The intermediate 2,4,5,6-tetrahydrocyclopenta[c]-pyrrole-4-carbonitriles of formula II are prepared by a variety of different methods depending upon the identities of the various R₃, R₄, R₅, R₆ and R₇ groups. For example, the nitriles where R₃, R₄ and R₅ are each methyl, R₆ is lower-alkyl, hydroxymethyl or phenyl-lower-alkyl, and R₇ is hydrogen, which are represented by formula IIa, are prepared by reaction of an alkanedione (or diphenylalkanedione), in which the two keto groups are separated by two carbon atoms as represented by formula III, with 2-amino-2-methylpropionitrile having the formula IV. The method is represented by the reaction:

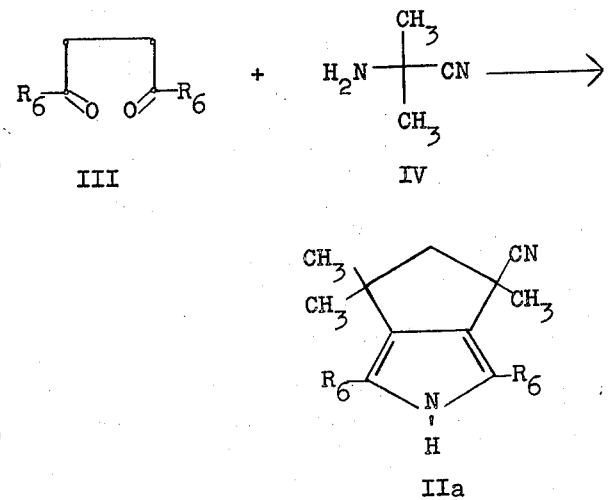

where R₆ has the meanings given above, and preferably takes place in an acid medium, for example glacial acetic acid. Surprisingly, the reaction does not produce a pyrrole derivative having an α,α-dimethylacetonitrile group attached to the nitrogen atom of the pyrrole ring, as might be expected, but instead affords the 2,4,5,6-tetrahydrocyclopenta[c]pyrrole derivatives of formula IIa above-indicated. The reaction is carried out in the presence of an acid catalyst, for example glacial acetic acid or trifluoroacetic acid.

Alternatively, the same transformation can be effected by use of excess acetone and a source of ammonia, e.g. an ammonium salt such as ammonium acetate, and a source of cyanide ion, e.g. an alkali metal cyanide, in place of the 2-amino-2-methylpropionitrile.

The reaction is carried out under the same conditions described above for the reaction based on 2-amino-2-methylpropionitrile.

Alternatively, the compounds of formula II where $R_3$, $R_4$ and $R_5$ are each methyl, $R_6$ is lower-alkyl, hydroxymethyl, phenyl-lower-alkyl, and $R_7$ has the various meanings given above, which are represented by formula IIb below, can be prepared by reaction of 2-amino-2-methylpropionitrile having the formula IV above with a 1-$R_7$-2,5-di-$R_6$-substituted-pyrrole having the formula V using the same reaction conditions as described above for the preparation of the compounds of formula IIa using the alkanedione route. In addition, the presence of a strong organic acid such as chloroacetic acid or trifluoroacetic acid is desirable. The method is represented by the reaction:

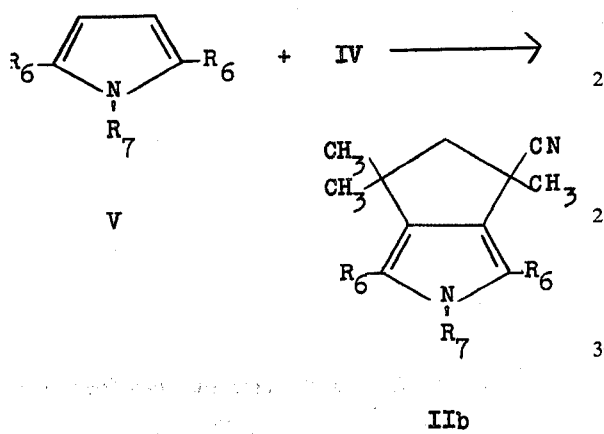

IIb where $R_6$ and $R_7$ have the meanings given above.

Alternatively, the same transformation can be effected by use of excess acetone, along with a source of ammonia, e.g. an ammonium salt such as ammonium acetate, and a source of cyanide ion, e.g. an alkali metal cyanide, in place of the 2-amino-2-methylpropionitrile. The reaction is carried out under the same conditions described above for the reaction based on 2-amino-2-methylpropionitrile.

The 1-$R_7$-2,6-di-$R_6$-substituted-pyrroles of formula V where $R_6$ is hydroxymethyl, lower-alkyl or phenyl-lower-alkyl are in turn each prepared by reacting an alkanedione, dihydroxyalkanedione or diphenylalkanedione having the formula III above with an appropriate amine, $R_7NH_2$, under dehydrating conditions. The reaction is preferably carried out by refluxing the reactants in a water-immiscible organic solvent, for example benzene, toluene or xylene, using a water separator, i.e. a Dean-Stark trap, to separate the water and remove it from the reaction medium as it is formed during the reaction.

Alternatively, the compounds of formula II where $R_3$, $R_4$ and $R_5$ are methyl, $R_6$ is hydroxymethyl, lower-alkyl or phenyl-lower-alkyl, and $R_7$ has the various meanings given above, which are represented by formula IIb, are prepared by condensation of a 1-$R_7$-2,5-di-$R_6$-substituted-pyrrole of formula V with excess acetone in the presence of a source of cyanide ion, e.g. an alkali metal cyanide, and a molar excess of a mineral acid, for example hydrochloric acid or sulfuric acid. The resulting 3,3,3',3'-tetramethyl-4,4',6,6'-tetra-$R_6$-1,1'-spirobis(cyclopenta[4,5-c]pyrrole) of formula VI is then reacted with a source of ammonia, e.g. ammonium acetate, and a source of cyanide ions, e.g. an alkali metal cyanide, in the presence of glacial acetic acid. The initial condensation of the 1-$R_7$-2,5-di-$R_6$-substituted-pyrrole of formula V with acetone preferably takes place by short refluxing of the reactants. The method is represented by the following reactions:

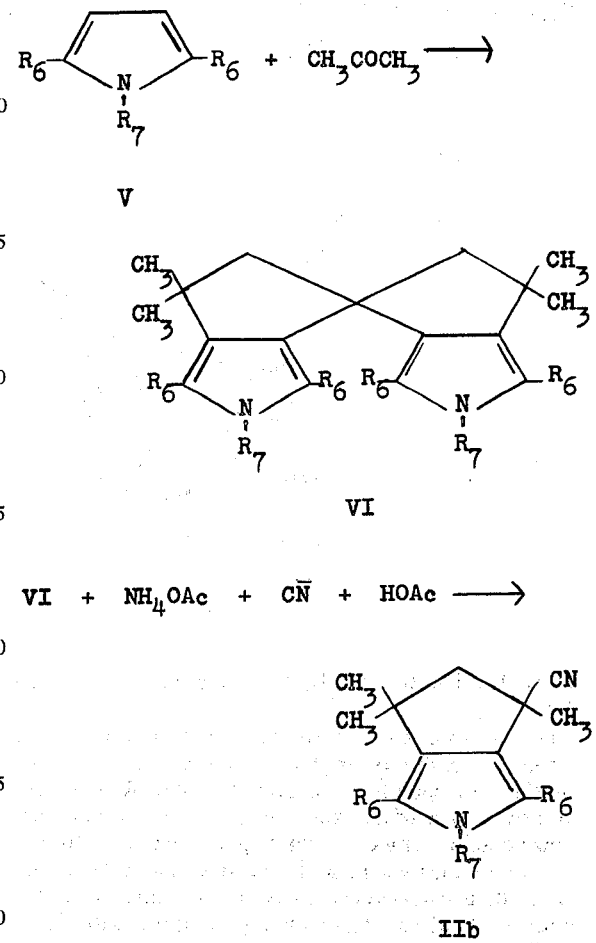

IIb where $R_6$ and $R_7$ have the meanings given above.

Alternatively, the 3,3,3',3'-tetramethyl-4,4',6,6'-tetra-$R_6$-1,1'-spirobis(cyclopenta[4,5-c]pyrroles) of formula VI can be prepared by reaction of a 1-$R_7$-2,5-di-$R_6$-substituted-pyrrole of formula V with a molar excess of 2-amino-2-methylpropionitrile of formula IV, preferably in the presence of a strong organic acid using the same conditions as described above for the preparation of the compounds of formula IIb from a 1-$R_7$-2,5-di-$R_6$-substituted-pyrrole of formula V and 2-amino-2-methylpropionitrile of formula IV. In fact, the spiro compounds can often be isolated as a by-product in the latter process.

The compounds of formula II where $R_6$ is formyl are prepared by reaction of the compounds of formula IIc, where $R_6$ is methyl and $R_3$, $R_4$, $R_5$ and $R_7$ have the meanings given above, with four moles of sulfuryl chloride, which affords the corresponding compounds where each $R_6$ group is dichloromethyl ($Cl_2CH$), represented by formula IId, followed by hydrolysis of the latter with water and a water miscible organic solvent, which only serves to promote solution of the starting material, for example dioxane, acetone, ethylene glycol, or a lower-alkanol, to give the corresponding compounds where both $R_6$ groups are formyl, which are represented by formula IIe. The method is represented by the following reactions:

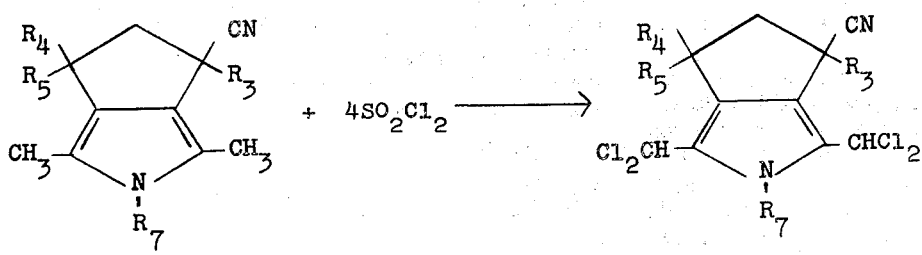

IIc               IId

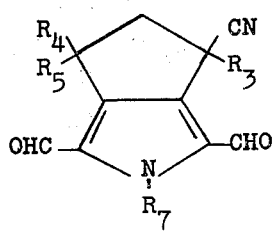

IIe where $R_3$, $R_4$, $R_5$ and $R_7$ have the meanings given above.

The compounds of formulas I and II where $R_6$ is carboxy or carbo-lower-alkoxy are prepared by oxidizing the corresponding compounds where $R_6$ is formyl with two moles of an oxidizing agent, for example perbenzoic acid, peracetic acid or performic acid, to give the compounds where $R_6$ is carboxy. The compounds where $R_6$ is carbo-lower-alkoxy are prepared from the latter by standard esterification procedures with a lower-alkanol.

The compounds of formula II where $R_6$ is hydrogen, which are represented by formula IIf, are prepared by decarbonylation of the corresponding compounds where $R_6$ is formyl, which are represented by formula IIe above, over a palladium-on-charcoal catalyst. The reaction is carried out in an inert organic solvent, preferred solvents being glycols having a boiling point around 200°C. or higher, for example ethylene glycol, propylene glycol, glycerol, and the like. The reaction is preferably carried out at an elevated temperature, i.e. at the boiling point of the solvent used, which serves to shorten the reaction time but is otherwise not critical. The reaction is represented by the equation:

where $R_3$, $R_4$, $R_5$ and $R_7$ have the meanings given above.

The compounds of formula II where $R_3$ is hydrogen or methyl; $R_4$ and $R_5$ are hydrogen; $R_6$ is lower-alkyl or phenyl-lower-alkyl; and $R_7$ has the various meanings given above, which are represented by formula IIg below, are prepared by a sequence of reactions involving, first, conversion of a 1-$R_7$-2,5-di-$R_6$-substituted-pyrrole of formula V to the corresponding 3-formyl derivative having the formula VIII by the Vilsmeier-Haack reaction, which comprises reacting the pyrrole with dimethylformamide in the presence of phosphorus oxychloride at a temperature in the range from 50°–100°C. and decomposition of the mixture with aqueous sodium acetate; conversion of the formyl compound to the corresponding 3-acrylonitrile derivative of formula IX by reaction of the formyl derivative with sodium hydride in dimethylformamide, followed by reaction of the resulting sodium salt with diethyl phosphonoacetonitrile

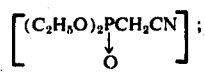

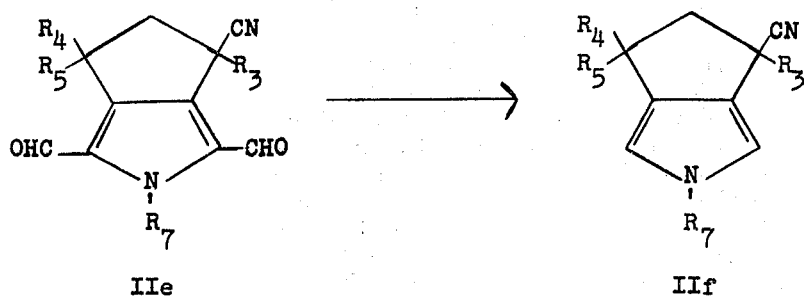

IIe               IIf catalytic reduction of the resulting acrylonitrile derivative to the corresponding propionitrile derivative of formula X; reaction of the latter with either methyl lithium (to prepare the compounds of formula XI wherein $R_3$ is $CH_3$) or with diisobutyl aluminum hydride (to prepare the corresponding compound of formula XI where $R_3$ is hydrogen) in diethyl ether at the reflux temperature; and cyclization of the imino compounds thus obtained by heating with ammonium acetate and a cyanide salt, for example an alkali metal cyanide, in the presence of glacial acetic acid. The method is represented by the following reactions:

in the range from 15° to about 70°C. and is preferably carried out in dimethylsulfoxide. The same compounds where $R_7$ is 2-cyanoethyl, 2-(carbo-lower-alkoxy)ethyl or 2-carboxamidoethyl are prepared by reaction of the compounds of formula II where $R_7$ is hydrogen with acrylonitrile, an acrylic ester of acrylamide, respectively, in the presence of a strong base, for example benzyltrimethylammonium hydroxide. The reaction is carried out in an inert organic solvent, for example dioxane, diethyl ether, tetrahydrofuran, and the like. The reaction generally takes place at room temperature.

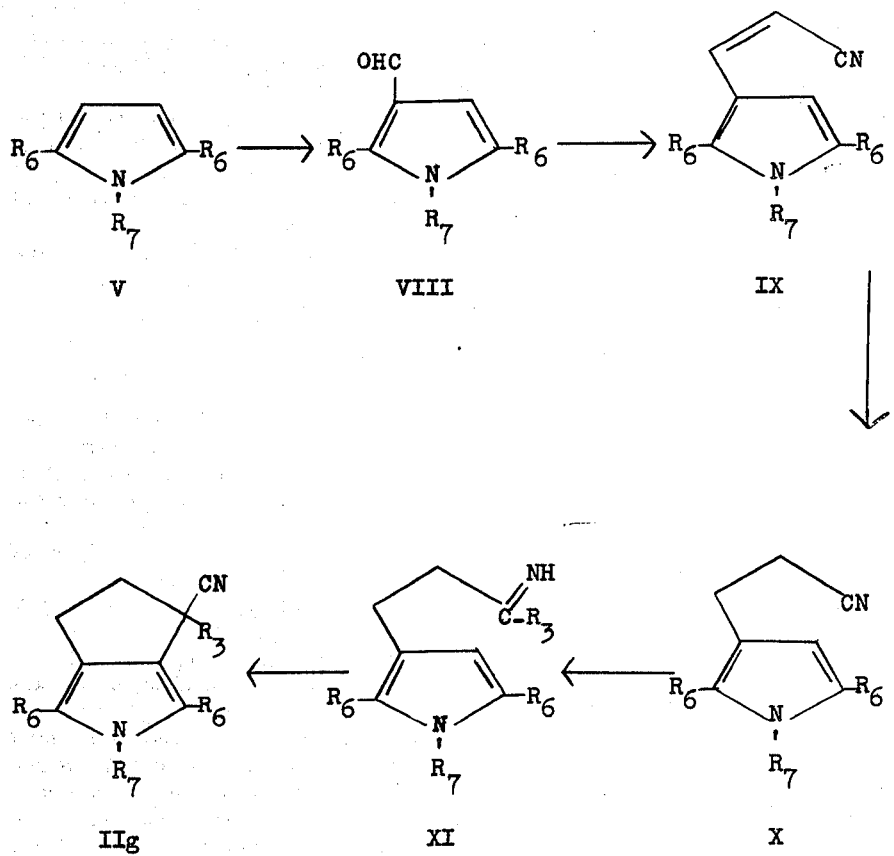

where $R_3$, $R_6$ and $R_7$ have the meanings given above.

The compounds of formula II where $R_3$, $R_4$ and $R_5$ have all the various meanings given above, $R_6$ is hydrogen, lower-alkyl or phenyl-lower-alkyl, and $R_7$ is lower-alkyl, di-lower-alkylamino-lower-alkyl, morpholino-lower-alkyl, 1-pyrrolidinyl-lower-alkyl, 1-piperidinyl-lower-alkyl, cycloalkyl-lower-alkyl, phenyl-lower-alkyl, cyano-lower-alkyl, carbo-lower-alkoxy-lower-alkyl, carboxamido-lower-alkyl or divalent-lower-alkylene can also be prepared by reacting the corresponding compounds where $R_7$ is hydrogen with a strong base, for example an alkali metal hydride or an alkali metal amide, in an inert organic solvent, for example dimethylsulfoxide, dioxane, dimethylformamide, tetrahydrofuran or dibutyl ether, and reacting the resulting salt with an appropriate alkylating agent, $R_7X$, where X is the anion of a strong mineral acid, for example a hydrogen halide or sulfuric acid, and $R_7$ has the meanings given above. The reaction takes place at a temperature With the exception of the compounds of formula V, whose method of preparation has been described, all the other starting materials herein are well-known groups of compounds, and many are commercially available.

In standard biological test procedures, described generally by Shay et. al., Gastroenterology 5, 43 (1945) and 26, 906 (1954), the compounds of formula I have been found to possess anti-secretory and anti-ulcer activity and are thus useful as anti-secretory and anti-ulcer agents. Anti-secretory activity was determined in male albino Wistar rats weighing approximately 180 g. using the test procedure described as follows: The rats were divided into medicated groups of at least five rats each and control groups of ten rats. The rats were medicated orally once daily for 2 days prior to stomach ligation and once again immediately following ligation. All drugs were administered as the free base, and control rats received only the vehicle of medication. The rats were housed individually in wire cages, and food was withdrawn fortyeight hours prior to surgery, and water was withdrawn at the time of surgery. Laparotomy was performed under light ether anesthesia, the pyloric-duodenal junction was ligated, and the wound was closed with metal clips and sprayed with a protective surgical dressing. Five hours following surgery, the rats were sacrificed, the stomach was removed, and the gastric juice collected.. The gastric fluid was centrifuged, and total volume, color, and volume of solids were recorded. The pH of the gastric fluid was then determined on a Beckman pH meter, and the "free" and "total" acid was determined from an aliquot of the gastric fluid by titrating with 0.1N sodium hydroxide against Toepfers reagent and phenolphthalein, respectively. The difference between the average amount of "free" acid (expressed as milliequivalents of hydrochloric acid per liter of gastric fluid) of the medicated and control groups was expressed as percent gastric secretory change.

The anti-ulcer activity of the compounds was determined using the reserpine-induced anti-ulcer test method which is described briefly as follows: Male, albino, Sprague-Dawley rats, weighing approximately 300 g., were divided into medicated and control groups of at least five rats each, and one positive control group of five rats medicated with a known drug at the active dose was run with each experiment. The rats were medicated 48, 24, and 1 hour before receiving an injection of reserpine. All test drugs were administered orally in terms of base, and the control rats received only the vehicle of medication. The rats were housed individually in wire cages, and food was withdrawn 24 hours prior to injection of reserpine, while water was allowed ad libitium. One hour following the third medication, 5.0 mg. of reserpine per kilogram of body weight in a concentration of 5 mg./ml. was injected intramuscularly in each rat. Eighteen hours after injection the rats were sacrificed, their stomachs removed, opened along the greater curvature, rinsed in warm saline, and pinned to a cork board for gross observation. The stomachs were examined for the number and size of ulcerations located in the glandular portion of the stomach with the aid of a one millimeter grid ocular with a 10x dissecting microscope. The degree of ulceration was arbitrarily graded according to the number and size of the ulcers as follows:

0 < 1 mm.$^2$ 1 point
  1 < 3 mm.$^2$ 2 points
  $\geq$ 3 mm.$^2$ 5 points.

The points were added together and divided by the number of rats in each group to give an ulcer score, and the difference in the mean scores of the medicated and control group was expressed as percent inhibition of ulceration.

The 2,4,5,6-tetrahydrocyclopenta[c]pyrrole-4-carboxamides and 4-thiocarboxamides of formula I were thus found to inhibit secretion of gastric fluids and to inhibit reserpineinduced stomach ulceration when administered in a dose range of from around 10 mg./kg. to around 200 mg./kg. The compounds are preferably administered orally, and the amount of a particular compound to be administered, either alone or as the essential active ingredient in a formulation, will range from about 10 to about 200 mg./kg.

The actual determination of the numerical biological data definitive for a particular compound of formula I is readily determined by standard test procedures by technicians versed in pharmacological test procedures without the need for any extensive experimentation.

The compounds of formula I can be prepared for use by incorporation in unit dosage form as tablets or capsules for oral administration either alone or in combination with suitable adjuvants such as calcium carbonate, starch, lactose, sodium bicarbonate, sodium lauryl sulfate, sugar, dextrose, mannitol, cellulose, gum acacia, and the like. Alternatively, they can be formulated for oral administration in aqueous alcohol, glycol, or oil solutions or oil-water emulsions in the same manner as conventional medicinal substances are prepared. They can also be formulated for oral use with foodstuffs or admixed with foodstuffs for veterinary use.

The molecular structures of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

EXAMPLE 1

A mixture of 57 g (0.5 mole) of 2,5-hexanedione and 43.5 g. (0.56 mole) of 40% aqueous methylamine in 250 ml. of benzene was refluxed under a Dean-Stark trap until no more water was carried over, and the resulting solution was taken to dryness. The residual oily material was distilled in vacuo to give 34 g. of 1,2,5-trimethylpyrrole, b.p. 58°–59°C./20 mm.

A mixture of 260 g. (2.4 moles) of 1,2,5-trimethylpyrrole, 280 g. (4.8 moles) of acetone, 185 g. (2.4 moles) of ammonium acetate and 320 g. (4.8 moles) of potassium cyanide in one liter of glacial acetic acid was stirred and heated under reflux under a nitrogen atmosphere for 2 days. The mixture was cooled to about 60°C., poured into an ice-water mixture with stirring, and the solid which separated was dissolved in 3 liters of diethyl ether, the solution washed with water and saturated bicarbonate, and taken to dryness to give 412 g. of crude product which was recrystallized from hexane to give 151 g. of 2,4,5,6-tetrahydro-1,2,3,4,6,6-hexamethylcyclopenta[c]pyrrole-4-carbonitrile, m.p. 123°–125°C.

A mixture of 22 g. (0.10 mole) of the latter in 10 ml. of water and 100 ml. of concentrated sulfuric acid was warmed to 85°C. on a steam bath and heated with stirring for about 5 minutes. The resulting dark brown solution was poured into water, basified with 35% aqueous sodium hydroxide until no further solid separated, and the solid which precipitated was collected, washed with water, air dried, and recrystallized with charcoaling from ethyl acetate to give 17.3 g. of 2,4,5,6-tetrahydro-1,2,3,4,6,6-hexamethylcyclopenta[c]pyrrole-4carboxamide, m.p. 184.5°–187.5°C.

The latter compound, when administered orally in rats in the anti-secretory and the reserpine-induced anti-ulcer tests at doses of 25, 50, 100 and 200 mg./kg., produced, respectively, 9, 50, 84 and 96% reduction in the pH of gastric fluid, and 60, 60, 100 and 100% reduction in the ulcer score.

EXAMPLE 2

To a solution of 220 g. (4.1 moles) of ammonium chloride, 232 g. (4.0 moles) of acetone and 600 ml. of diethyl ether was added with cooling and vigorous stirring a solution of 280 g. (4.3 moles) of potassium cyanide in 440 ml. of water. The cooling bath was then removed, the mixture stirred at room temperature overnight, the organic phase separated, and the aqueous phase washed with diethyl ether. The combined organic fractions were dried and taken to dryness to give a yellow liquid which was distilled in vacuo to give 162 g. of 2-amino-2-methylpropionitrile, b.p. 61°–62°C./20 mm.

A mixture of 119 g. (1.42 moles) of 2-amino-2-methylpropionitrile, 155 g. (1.36 moles) of 2,5-hexanedione and 500 ml. of glacial acetic acid was refluxed under nitrogen for about four days, and the reaction mixture was evaporated to dryness. (With an equimolar amount of trifluoroacetic acid present, the reaction time can be decreased to 3 hours.) The residue was taken up in diethyl ether, washed repeatedly with dilute hydrochloric acid, water, then dilute aqueous sodium bicarbonate, dried over sodium sulfate, and taken to dryness to give a brown solid which was recrystallized from acetonitrile to give about 33 g. of 2,4,5,6-tetrahydro-1,3,4,6,6-pentamethylcyclopenta[c]pyrrole-4-carbonitrile, m.p. 130°–140°C., which on sublimation afforded 26.7 g. of the compound having m.p. 150.5°–152.5°C.

The latter (60 g., 0.3 mole) was hydrolyzed with a solution of 200 ml. of concentrated sulfuric acid and 20 ml. of water using the procedure described above in Example 1. The crude material was recrystallized from ethyl acetate to give 28 g. of 2,4,5,6-tetrahydro-1,3,4,6,6-pentamethylcyclopenta[c]pyrrole-4-carboxamide, m.p. 230°–233°C.

EXAMPLE 3

To a solution prepared by heating 23.2 g. (0.55 mole) of a 67% mineral oil dispersion of sodium hydride in 200 ml. of anhydrous dimethylsulfoxide was added 50.5 g. (0.25 mole) of the 2,4,5,6-tetrahydro-1,3,4,6,6-pentamethylcyclopentapyrrole-4-carbonitrile described above in Example 2. The mixture was stirred under nitrogen for about 2 hours, cooled to 15°C., and treated with 39.5 g. (0.25 mole) of 3-chloro-N,N-dimethylpropylamine hydrochloride. When the foaming had subsided, the mixture was stirred at room temperature overnight, poured into water, and the gummy solid which separated was taken into diethyl ether and the solution washed first with water, then with saturated brine, dried and taken to dryness to give 69 g. of a solid which was recrystallized once from hexane and once from isopropanol to give 29 g. of 2-[3-(dimethylamino)propyl]-2,4,5,6-tetrahydro-1,3,4,6,6-pentamethylcyclopenta[c]pyrrole-4-carbonitrile, m.p. 90.5°–91.0°C.

In two separate runs, 16 g. (0.055 mole) and 13.3 g. (0.046 mole) of the latter were hydrolyzed (80 ml.:8 ml. and 50 ml.:5 ml. solutions of sulfuric acid:water, respectively) using the procedure described above in Example 1. The combined crude product was recrystallized from acetonitrile to give 19.0 g. of 2-[3-(dimethylamino)propyl]-2,4,5,6-tetrahydro-1,3,4,6,6-pentamethylcyclopenta[c]pyrrole-4-carboxamide, m.p. 114.5°–116°C.

The latter compound, when administered orally to rats in the anti-secretory and reserpine-induced anti-ulcer activity tests at a dose of 100 mg./kg., produced a 20% reduction in pH of the gastric fluid and a 60% reduction in the ulcer score.

EXAMPLE 4

A mixture of 114 g. (1.0 mole) of 2,5-hexanedione, 58 g. (0.5 mole) of 1,6-hexanediamine and a small amount of p-toluenesulfonic acid in 500 ml. of benzene was refluxed under a Dean-Stark trap until no more water was given off. The reaction mixture was taken to dryness, and the residue recrystallized once from methanol and once from cyclohexane to give 66 g. of 1,1'-hexamethylenebis[2,5-dimethylpyrrole], m.p. 102°–105°C.

A mixture of 27.2 g. (0.1 mole) of the latter, 33.6 g. (0.4 mole) of 2-amino-2-methylpropionitrile, 50 g. (0.4 mole), of trifluoroacetic acid and 200 ml. of glacial acetic acid was heated under reflux for about 2½ hours, then cooled, poured into water, and the gummy solid which separated was filtered, washed with water, and recrystallized from hot acetonitrile to give 14.3 g. of 2,2'-hexamethylenebis[2,4,5,6-tetrahydro-1,3,4,6,6-pentamethylcyclopenta[c]pyrrole-4-carbonitrile], m.p. 227.5°–229.5°C.

The latter (45 g., 0.92 mole) was hydrolyzed with a solution of 180 ml. of concentrated sulfuric acid and 18 ml. of water using the procedure described in Example 1. The crude material was recrystallized with charcoaling from dimethylformamide to give 10.5 g. of 2,2'-hexamethylenebis[2,4,5,6-tetrahydro- 1,3,4,6,6-pentamethylcyclopenta[c]pyrrole-4-carboxamide], m.p. 218°–221°C.

In anti-secretory activity tests, the latter compound produced a 24% reduction in pH of gastric fluid at a dose of 100 mg./kg. (p.o.).

EXAMPLE 5

Reaction of 2,4,5,6-tetrahydro-1,2,3,4,6,6-hexamethylcyclopenta[c]pyrrole-4-carbonitrile, described above in Example 1, in an autoclave at 150°–160°C. with an ethanol solution saturated with anhydrous ammonia and anhydrous hydrogen sulfide affords 2,4,5,6-tetrahydro-1,2,3,4,6,6-hexamethylcyclopenta[c]pyrrole-4-thiocarboxamide.

EXAMPLE 6

Reaction of 2-[3-(dimethylamino)propyl]-2,4,5,6-tetrahydro-1,3,4,6,6-pentamethylcyclopenta[c]pyrrole-4-carbonitrile, described in Example 3, in an autoclave at 150°–160°C. with an ethanol solution saturated with anhydrous ammonia and anhydrous hydrogen sulfide affords 2-[3-(dimethylamino)propyl]-2,4,5,6-tetrahydro-1,3,4,6,6-pentamethylcyclopenta[c]pyrrole-4-thiocarboxamide.

EXAMPLE 7

Reaction of 2,4,5,6-tetrahydro-1,2,3,4,6,6-hexamethylcyclopenta[c]pyrrole-4-carboxamide, described above in Example 1, with one molar equivalent of sodium hydride in boiling toluene, followed by reaction of the resulting sodium salt with one molar equivalent of methyl iodide affords 2,4,5,6-tetrahydro-1,2,3,4,6,6-hexamethylcyclopenta[c]pyrrole-4-N-methylcarboxamide.

EXAMPLE 8

Reaction of 2,4,5,6-tetrahydro-1,2,3,4,6,6-hexamethylcyclopenta[c]pyrrole-4-N-metnylcarboxamide, described above in Example 7, with one molar equivalent of sodium hydride in boiling toluene, followed by reaction of the resulting sodium salt with one molar equivalent of methyl iodide affords 2,4,5,6-tetrahydro-1,2,3,4,6,6-hexamethylcyclopenta[c]pyrrole-4-N,N-dimethylcarboxamide.

EXAMPLE 9

Reaction of 2-[3-(dimethylamino)propyl]-2,4,5,6-tetrahydro-1,3,4,6,6-pentamethylcyclopenta[c]pyrrole-4-carboxamide, described above in Example 3, with one molar equivalent of sodium hydride in boiling toluene, followed by reaction of the resulting sodium salt with one molar equivalent of methyl iodide affords 2-[3-(dimethylamino)propyl]-2,4,5,6-tetrahydro-1,3,4,6,6-pentamethylcyclopenta[c]pyrrole-4-N-methylcarboxamide.

EXAMPLE 10

Reaction of 2-[3-(dimethylamino)propyl]-2,4,5,6-tetrahydro-1,3,4,6,6-pentamethylcyclopenta[c]pyrrole-4-N-methylcarboxamide, described above in Example 9, with one molar equivalent of sodium hydride in boiling toluene, followed by reaction of the resulting sodium salt with methyl iodide affords 2-[3-(dimethylamino)propyl]-2,4,5,6-tetrahydro-1,3,4,6,6-pentamethylcyclopenta[c]pyrrole-4-N,N-dimethylcarboxamide.

EXAMPLE 11

A mixture of 57 g. (0.5 mole) of 2,5-hexanedione, 60 g. (0.5 mole) of 2-phenethylamine and a small amount of p-toluenesulfonic acid in 300 ml. of benzene was heated under reflux using a Dean-Stark trap for about an hour and a half. The reaction mixture was taken to dryness in vacuo and the residual oil distilled in vacuo to give 91 g. of 1-(2-phenethyl)-2,5-dimethylpyrrole as a pale yellow liquid, b.p. 163°–165°C./15–20 mm.

A mixture of 40 g. (0.2 mole) of 1-(2-phenethyl)-2,5-dimethylpyrrole, 33.6 g. (0.4 mole) of 2-amino-2-methylpropionitrile and 29.7 ml. (0.4 mole) of trifluoroacetic acid in 200 ml. of glacial acetic acid was refluxed under nitrogen for three hours and then poured into ice water. The brown gum which separated gradually solidified, and was separated by decantation and then dissolved in ether. The organic solution was washed with water, then with dilute aqueous sodium bicarbonate, then with brine, dried over sodium sulfate and taken to dryness to give a brown solid which was recrystallized twice from methanol to give about 40 g. of 2-(2-phenethyl)-2,4,5,6-tetrahydro-1,3,4,6,6-pentamethylcyclopenta[c]pyrrole-4-carbonitrile, m.p. 92°–94°C.

The latter (56 g., 0.18 mole) was hydrolyzed in a solution of 180 ml. of concentrated sulfuric acid and 18 ml. of water using the procedure described above in Example 1. The crude material was recrystallized three times from cyclohexane to give 17.8 g. of 2-(2-phenethyl)-2,4,5,6-tetrahydro-1,3,4,6,6-pentamethylcyclopenta[c]pyrrole-4-carboxamide, m.p. 115.5°–117.5°C.

The latter compound, administered orally at a dose of 100 mg./kg. in rats in the anti-secretory activity test, produced a 7% reduction in the pH of gastric fluid.

EXAMPLE 12

A mixture of 114 g. (1.0 mole) of 2,5-hexanedione, 172 g. (1.0 mole) of 4-aminobenzenesulfonamide and 2 g. of p-toluenesulfonic acid hydrate in 800 ml. of benzene was refluxed under nitrogen using a Dean-Stark trap for a period of about 36 hours. The reaction mixture was concentrated to a small volume, and the residue recrystallized from methanol to give 118 g. of 1-(4-sulfamylphenyl)-2,5-dimethylpyrrole, m.p. 157°–158.5°C.

In two separate runs, a mixture of 25 g. (0.1 mole) of 1-(4-sulfamylphenyl)-2,5-dimethylpyrrole, 18.5 (0.22 mole) of 2-amino-2-methylpropionitrile and 16.5 ml. of trifluoroacetic acid in 50 ml. of glacial acetic acid was heated under reflux for 3 hours, poured into water, and the solid which separated was collected, washed with water and dried, and the combined crude product recrystallized once from methanol and once from ethanol to give 57 g. of 2-(4-sulfamylphenyl)-2,4,5,6-tetrahydro-1,3,4,6,6-pentamethylcyclopenta[c]pyrrole-4-carbonitrile, m.p. 255°–257°C.

The latter (44 g., 0.12 mole) was hydrolyzed in a solution of 120 ml. of concentrated sulfuric acid and 12 ml. of water using the procedure described above in Example 1. The crude material was recrystallized once from ethanol and once from methanol to give 1.8 g. of 2-(4-sulfamylphenyl)-2,4,5,6-tetrahydro-1,3,4,6,6-pentamethylcyclopenta[c]pyrrole-4-carboxamide, m.p. 258°–260°C.

The latter compound, administered at a dose of 100 mg./kg. orally in rats in the anti-secretory activity test, produced a 4% reduction in the pH of gastric fluid.

EXAMPLE 13

A mixture of 114 g. (1.0 mole) of 2,5-hexanedione, 100 ml. (1.1 moles) of aniline and 5 ml. of glacial acetic acid in 600 ml. of benzene was heated under reflux using a Dean-Stark trap, and when reaction was complete, the solvent was removed in vacuo and the residue distilled in vacuo to give a total of 152 g. of 1-phenyl-2,5-dimethylpyrrole, b.p. 155°–160°C./15 mm.

A mixture of 17.1 g. (0.1 mole) of 1-phenyl-2,5-dimethylpyrrole, 18.5 g. (0.2 mole) of 2-amino-2-methylpropionitrile and 22.8 g. (0.2 mole) of trifluoroacetic acid in 75 ml. of glacial acetic acid was refluxed for 16 hours under a nitrogen atmosphere, then poured into water, and the mixture worked up in the manner described above in Example 11. There was thus obtained 24.5 g. of 2-phenyl-2,4,5,6-tetrahydro-1,3,4,6,6-pentamethylcyclopenta[c]pyrrole-4-carbonitrile, m.p. 115°–117.5°C.

The latter (10 g., 0.036 mole) was hydrolyzed with dilute sulfuric acid using the procedure described above in Example 1. The product was combined with the crude product from three other runs (a total of about 28 g.), and the combined material recrystallized from cyclohexane to give 18.0 g. of 2-phenyl-2,4,5,6-tetrahydro-1,3,4,6,6-pentamethylcyclopenta[c]pyrrole-4-carboxamide, m.p. 140°C.

In a separate run following the above procedure in which approximately a 1 kg. batch of the above-identified 2-phenyl-2,4,5,6-tetrahydro-1,3,4,6,6-pentamethylcyclopenta[c]-pyrrole-4-carbonitrile was prepared, a sample of a by-product weighing approximately 100 g. was isolated, and the latter was recrystallized from toluene to give 69 g. of 3,3,3',3',4,4',6,6'-octamethyl-5,5'-diphenyl-1,1'-spirobis(cyclopenta[4,5-c]pyrrole), m.p. 210°–212°C.

The latter, on reaction with two molar equivalents each of acetone and ammonium acetate and four molar equivalents of potassium cyanide in glacial acetic acid affords 2-phenyl-2,4,5,6-tetrahydro-1,3,4,6,6-pentamethylcyclopenta[c]pyrrole-4-carbonitrile, identical with that obtained above.

The above-identified 2-phenyl-2,4,5,6-tetrahydro-1,3,4,6,6-pentamethylcyclopenta[c]pyrrole-4-carboxamide, when administered orally to rats in the antisecretory and the reserpine-induced anti-ulcer tests at doses of 25, 50 and 100 mg./kg., produced, respectively, 52, 75 and 100% reduction in the pH of gastric fluid and, respectively, 73, 100 and 100% reduction in ulcer score.

EXAMPLE 14

Reaction of 2-(2-phenylethyl)-2,4,5,6-tetrahydro-1,3,4,6,6-pentamethylcyclopenta[c]pyrrole-4-carbonitrile, described above in Example 11, in an autoclave at 150°–160°C. with an ethanol solution saturated with anhydrous ammonia and anhydrous hydrogen sulfide affords 2-(2-phenylethyl)-2,4,5,6-tetrahydro-1,3,4,6,6-pentamethylcyclopenta[c]pyrrole-4-thiocarboxamide.

EXAMPLE 15

Reaction of 2-phenyl-2,4,5,6-tetrahydro-1,3,4,6,6-pentamethylcyclopenta[c]pyrrole-4-carbonitrile, described above in Example 13, in an autoclave at 150°–160°C. with an ethanol solution saturated with anhydrous ammonia and anhydrous hydrogen sulfide affords 2-phenyl-2,4,5,6-tetrahydro-1,3,4,6,6-pentamethylcyclopenta[c]pyrrole-4-thiocarboxamide.

EXAMPLE 16

Reaction of 2-(2-phenylethyl)-2,4,5,6-tetrahydro-1,3,4,6,6-pentamethylcyclopenta[c]pyrrole-4-carboxamide, described above in Example 11, with one molar equivalent of sodium hydride in refluxing toluene, and reaction of the resulting sodium salt with one molar equivalent of methyl iodide affords 2-(2-phenylethyl)-2,4,5,6-tetrahydro-1,3,4,6,6-pentamethylcyclopenta[c]pyrrole-4-N-methylcarboxamide.

EXAMPLE 17

Reaction of the 2-(2-phenylethyl)-2,4,5,6-tetrahydro-1,3,4,6,6-pentamethylcyclopenta[c]pyrrole-4-N-methylcarboxamide described above in Example 16 with one molar equivalent of sodium hydride in refluxing toluene, and reaction of the resulting sodium salt with methyl iodide affords 2-(2-phenylethyl)-2,4,5,6-tetrahydro-1,3,4,6,6-pentamethylcyclopenta[c]pyrrole-4-N,N-dimethylcarboxamide.

EXAMPLE 18

Reaction of 2-phenyl-2,4,5,6-tetrahydro-1,3,4,6,6-pentamethylcyclopenta[c]pyrrole-4-carboxamide, described above in Example 13, with one molar equivalent of sodium hydride in refluxing toluene, and reaction of the resulting sodium salt with one molar equivalent of methyl iodide affords 2-phenyl-2,4,5,6-tetrahydro-1,3,4,6,6-pentamethylcyclopenta[c]pyrrole-4-N-methylcarboxamide.

EXAMPLE 19

To a stirred mixture of 10.5 g. (0.24 mole) of a 57% dispersion of sodium hydride in mineral oil (which was washed and decanted with hexane to remove the mineral oil) in 100 ml. of dimethylsulfoxide was added a solution of 29.6 g. (0.1 mole) of 2-phenyl-2,4,5,6-tetrahydro-1,3,4,6,6-pentamethylcyclopenta[c]pyrrole-4-carboxamide dissolved in 200 ml. of dimethylsulfoxide. The reaction mixture was stirred for about 1½ hours until evolution of hydrogen ceased, and then was treated dropwise with 35.5 g. (0.25 mole) of methyl iodide. After stirring for an additional two hours, the mixture was diluted with about 10 ml. of water, poured onto ice, and the white precipitate was removed by filtration. The filtrate was extracted with ether, added to an ether solution of the solid, and the combined organic solution washed several times with water, dried over sodium sulfate, and evaporated to dryness.

The resulting yellow oil (35.3 g.) was dissolved once again in 200 ml. of dimethylsulfoxide, added to a suspension of 6.0 g. of sodium hydride in dimethylsulfoxide, the mixture warmed to 75°C. for about 5 minutes, treated with 18 g. of methyl iodide as above, and then stirred for 1 hour at room temperature. The reaction mixture, when worked up in the manner described above, afforded 31.3 g. of yellow oil which slowly crystallized and which was recrystallized from a methanol/water mixture to give 27.7 g. of 2-phenyl-2,4,5,6-tetrahydro-1,3,4,6,6-pentamethylcyclopenta[c]pyrrole-4-N,N-dimethylcarboxamide, m.p. 100°–104°C.

EXAMPLE 20

A mixture of 57 g. (0.5 mole) of 2,5-hexanedione, 25 g. (0.55 mole) of ethylamine and a small amount of p-toluenesulfonic acid in 300 ml. of benzene was refluxed under a Dean-Stark trap until no further water was produced in the reaction. The reaction mixture was then taken to dryness and the residue distilled in vacuo to give 95 g. of 1-ethyl-2,5-dimethylpyrrole, b.p. 75°–78°C./15°–20 mm.

A mixture of 72 g. (0.59 mole) of 1-ethyl-2,5-dimethylpyrrole, 100 g. (1.17 moles) of 2-amino-2-methylpropionitrile and 87 ml. (1.17 moles) of trifluoroacetic acid in 400 ml. of glacial acetic acid was heated under reflux for about 3 hours and then worked up in the manner described above in Example 11. The crude product was recrystallized from methanol to give 42 g. of 2-ethyl-2,4,5,6-tetrahydro-1,3,4,6,6-pentamethylcyclopenta[c]pyrrole-4-carbonitrile.

The latter (37.2 g., 0.16 mole) was hydrolyzed in a solution of 160 ml. of concentrated sulfuric acid and 16 ml. of water using the procedure described above in Example 1. The crude product was recrystallized twice from ethyl acetate to give 15.2 g. of 2-ethyl-2,4,5,6-tetrahydro-1,3,4,6,6-pentamethylcyclopenta[c]pyrrole-4-carboxamide, m.p. 162°–164°C.

The latter compound, when administered orally to rats in the anti-secretory and the reserpine-induced anti-ulcer tests at doses of 50 and 100 mg./kg., produced, respectively, 55 and 95% reduction in the pH of gastric fluid and 60 and 100% reduction in the ulcer score.

EXAMPLE 21

A mixture of 59 g. (1.0 mole) of n-propylamine, 114 g. (1.0 mole) of 2,5-hexanedione and a small amount of p-toluenesulfonic acid in 600 ml. of benzene was refluxed under a Dean-Stark trap until no further water was produced, and the reaction mixture was worked up in the manner described above in Example 4. There was thus obtained 103 g. of 1-propyl-2,5-dimethylpyrrole, b.p. 80°–82°C./15–20 mm.

A mixture of 64 g. (0.5 mole) of 1-propyl-2,5-dimethylpyrrole and 84 g. (1.0 mole) of 2-amino-2-methylpropionitrile was heated under reflux for about twelve hours, then poured into water and worked up in the manner described above in Example 11. The crude product thus obtained was recrystallized from hexane to give 64 g. of 2-propyl-2,4,5,6-tetrahydro-1,3,4,6,6-pentamethylcyclopenta[c]pyrrole-4-carbonitrile, m.p. 75°–77°C.

The latter (40 g., 0.16 mole) was hydrolyzed in a solution of 170 ml. of sulfuric acid and 17 ml. of water using the procedure described above in Example 1. The crude product was recrystallized from isopropanol to give 34.4 g. of 2-propyl-2,4,5,6-tetrahydro-1,3,4,6,6-pentamethylcyclopenta[c]pyrrole-4-carboxamide, m.p. 164.5°–166.5°C.

The latter compound, when administered orally to rats in the anti-secretory and the reserpine-induced antiulcer tests at doses of 25, 50 and 100 mg./kg., produced, respectively, 56, 80 and 93% reduction in the pH of gastric fluid and 60, 100 and 100% reduction in the ulcer score.

EXAMPLE 22

A mixture of 11.6 g. (0.28 mole) of a 57% mineral oil dispersion of sodium hydride in 100 ml. of anhydrous dimethylsulfoxide was heated to 65°–70°C. until a clear dark solution was obtained. The solution was then cooled to 12°C. and treated all at once with a solution of 50.5 g. (0.25 mole) of 1,3,4,6,6-pentamethylcyclopenta[c]pyrrole-4-carbonitrile (described above in Example 2) in 100 ml. of dimethylsulfoxide, and the solution was stirred under nitrogen for 2 hours at room temperature. The mixture was then treated all at once with 31.6 g. (0.25 mole) of benzyl chloride, stirred at room temperature overnight, and the mixture then poured into 2 liters of water and the product extracted into diethyl ether. The combined ether extracts, after drying, were taken to dryness and the residual solid recrystallized twice from methanol to give 49 g. of 2-benzyl-2,4,5,6-tetrahydro-1,3,4,6,6-pentamethylcyclopenta[c]pyrrole-4-carbonitrile, m.p. 86°–88°C.

The latter (24 g., 0.083 mole) was hydrolyzed in a solution of 80 ml. of concentrated sulfuric acid and 8 ml. of water using the procedure described above in Example 1. The crude product was recrystallized from ethyl acetate to give 20.2 g. of 2-benzyl-2,4,5,6-tetrahydro-1,3,4,6,6-pentamethylcyclopenta[c]pyrrole-4-carboxamide, m.p. 170°–171°C.

The latter compound, when administered orally to rats in the anti-secretory and the reserpine-induced anti-ulcer activity tests at a dose of 100 mg./kg., produced a 4% reduction in the pH of gastric fluid and a 60% reduction in the ulcer score.

EXAMPLE 23

A mixture of 114 g. (1.0 mole) of 2,5-hexanedione, 123 g. (1.0 mole) of 4-methoxyaniline and a small amount of p-toluenesulfonic acid monohydrate in 600 ml. of benzene was refluxed under a Dean-Stark trap until no further water was formed, and the reaction worked up in the manner described above in Example 4. The crude product was distilled in vacuo to give 162 g. of 1-(4-methoxyphenyl)-2,5-dimethylpyrrole, b.p. 104°–105°C./0.01 mm.

A mixture of 162 g. (0.81 mole) 1-(4-methoxyphenyl)-2,5-dimethylpyrrole and 136 g. (1.6 mole) of 2-amino-2-methylpropionitrile in 600 ml. of glacial acetic acid was refluxed under nitrogen with stirring for forty-eight hours, and the mixture worked up in the manner described above in Example 11. The crude product was recrystallized once from ethyl acetate, slurried in 1 liter of boiling hexane, and finally recrystallized twice from isopropanol to give 74 g. of 2-(4-methoxyphenyl)-2,4,5,6-tetrahydro-1,3,4,6,6-pentamethylcyclopenta[c]pyrrole-4-carbonitrile.

The latter (70 g., 0.23 mole) was hydrolyzed with a solution of 230 ml. of concentrated sulfuric acid and 23 ml. of water using the procedure described above in Example 1. The crude product was recrystallized from isopropanol to give 37 g. of 2-(4-methoxyphenyl)-2,4,5,6-tetrahydro-1,3,4,6,6-pentamethylcyclopenta[c]pyrrole-4-carboxamide, m.p. 198.5°–201°C.

The latter compound, when administered orally to rats in the anti-secretory activity test at doses of 100 and 200 mg./kg., produced, respectively, 46 and 49% reduction in the pH of gastric fluid, and the same compound, when administered orally in rats in the reserpine-induced anti-ulcer test at doses of 25, 50 and 100 mg./kg., produced, in each instance, 100% reduction in the ulcer score.

EXAMPLE 24

A solution of 114 g. (1.0 mole) of 2,5-hexanedione, 107 g. (1.0 mole) of 4-methylaniline and a small amount of p-toluenesulfonic acid in 600 ml. of benzene was refluxed under a Dean-Stark trap, and when reaction was complete, the reaction mixture was worked up in the manner described above in Example 4. The product was distilled in vacuo to give 143 g. of 1-(4-methylphenyl)-2,5-dimethylpyrrole, b.p. 65°–76°C./0.05 mm.

A mixture of 93 g. (0.5 mole) of 1-(4-methylphenyl)-2,5-dimethylpyrrole, 92.4 g. (1.1 moles) of 2-amino-2-methylpropionitrile and 125 g. (1.1 moles) of trifluoroacetic acid in 375 ml. of glacial acetic acid was refluxed under a nitrogen atmosphere for two hours, then cooled and worked up in the manner described above in Example 11. There was thus obtained 140 g. of 2-(4-methylphenyl)-2,4,5,6-tetrahydro-1,3,4,6,6-pentamethylcyclopenta[c]pyrrole-4-carbonitrile.

The latter (58.4 g., 0.2 mole) was hydrolyzed in a solution of 200 ml. of concentrated sulfuric acid and 20 ml. of water using the procedure described above in Example 1. The crude product was recrystallized from acetonitrile to give 32 g. of 2-(4-methylphenyl)-

2,4,5,6-tetrahydro-1,3,4,6,6-pentamethylcyclopenta[c]pyrrole-4-carboxamide, m.p. 198°–202°C.

The latter compound, when administered orally in rats in the anti-secretory activity test at a dose of 100 mg./kg., produce a 10% reduction in the pH of gastric fluid.

EXAMPLE 25

A mixture of 114 g. (1.0 mole) of 2,5-hexanedione, 128 g. (1.0 mole) of 4-chloroaniline and 5 ml. of glacial acetic acid in 600 ml. of benzene was refluxed under a Dean-Stark trap for about sixteen hours and then worked up in the manner described above in Example 4. The product was distilled in vacuo to give 169 g. of 1-(4-chlorophenyl)-2,5-dimethylpyrrole, b.p. 104°C./0.04 mm.

A mixture of 147 g. (0.72 mole) of 1-(4-chlorophenyl)-2,5-dimethylpyrrole, 138 g. (1.64 moles) of 2-amino-2-methylpropionitrile and 187 g. (1.64 moles) of trifluoroacetic acid in 540 ml. of glacial acetic acid was refluxed for three hours and then worked up in the manner described above in Example 11. The crude product was recrystallized from isopropanol to give 125 g. of 2-(4-chlorophenyl)-2,4,5,6-tetrahydro-1,3,4,6,6-pentamethylcyclopenta[c]pyrrole-4-carbonitrile.

The latter (62.5 g., 0.2 mole) was hydrolyzed in a solution of 200 ml. of concentrated sulfuric acid and 20 ml. of water using the procedure described above in Example 1. The crude product was recrystallized from acetonitrile to give 34 g. of 2-(4-chlorophenyl)-2,4,5,6-tetrahydro-1,3,4,6,6-pentamethylcyclopenta[c]pyrrole-4-carboxamide, m.p. 165.5°–167.5°C.

The latter compound, when administered orally to rats in the anti-secretory activity test at a dose of 100 mg./kg., produced a 16% reduction in the pH of gastric fluid.

EXAMPLE 26

A mixture of 114 g. (1.0 mole) of 2,5-hexanedione, 127.6 g. (1.0 mole) of 3-chloroaniline and a small amount of p-toluenesulfonic acid in about 600 ml. of benzene was refluxed under a Dean-Stark trap, and when reaction was complete the mixture was worked up in the manner described above in Example 4. There was thus obtained 188 g. of 1-(3-chlorophenyl)-2,5-dimethylpyrrole, b.p. 96°–98°C./0.05 mm.

A mixture of 106.5 g. (0.52 mole) of 1-(3-chlorophenyl-2,5-dimethylpyrrole, 96 g. (1.14 moles) of 2-amino-2-methylpropionitrile and 130 g. (1.14 moles) of trifluoroacetic acid in 400 ml. of glacial acetic acid was heated under reflux for about 3 hours and then worked up in the manner described above in Example 11. The product was recrystallized from isopropanol/methanol to give 81.4g. of 2-(3-chlorophenyl)-2,4,5,6-tetrahydro-1,3,4,6,6-pentamethylcyclopenta[c]pyrrole-4-carbonitrile.

The latter (81.4 g., 0.26 mole) was hydrolyzed in a solution of 260 ml. of concentrated sulfuric acid and 26 ml. of water using the procedure described above in Example 1. The crude product was recrystallized from acetonitrile to give 60 g. of 2-(3-chlorophenyl)-2,4,5,6-tetrahydro-1,3,4,6,6-pentamethylcyclopenta[c]pyrrole-4-carboxamide, m.p. 139°–142°C.

The latter compound, when administered orally to rats in the anti-secretory and reserpine-induced anti-ulcer activity tests at a dose of 100 mg./kg. produced a 35% reduction in the pH of gastric fluid and a 70% reduction in ulcer score.

EXAMPLE 27

A mixture of 114 g. (1.0 mole) of 2,5-hexanedione, 94 g. (1.0 mole) of 2-aminopyridine and a small amount of p-toluenesulfonic acid in 600 ml. of benzene was heated under a Dean-Stark trap for about 60 hours, and the reaction mixture worked up in the manner described above in Example 11. The product was distilled in vacuo to give 132 g. of 1-(2-pyridyl)-2,5-dimethylpyrrole, b.p. 74°–90°C./0.03 mm.

A mixture of 93 g. (0.54 mole) of 1-(2-pyridyl)-2,5-dimethylpyrrole, 100 g. (1.19 moles) of 2-amino-2-methylpropionitrile and 90 ml. (1.19 moles) of trifluoroacetic acid in 425 ml. of glacial acetic acid was heated under reflux and the reaction worked up in the manner described above in Example 11. There was thus obtained 87 g. of 2-(2-pyridyl)-2,4,5,6-tetrahydro-1,3,4,6,6-pentamethylcyclopenta[c]pyrrole-4-carbonitrile as a yellow solid.

The latter (86 g., 0.31 mole) was hydrolyzed in a solution of 310 ml. of concentrated sulfuric acid and 31 ml. of water using the procedure described above in Example 1. The crude product was recrystallized from acetonitrile to give 32 g. of 2-(2-pyridyl)-2,4,5,6-tetrahydro-1,3,4,6,6-pentamethylcyclopenta[c]pyrrole-4-carboxamide, m.p. 187°–189°C.

The latter compound, when administered orally to rats in the anti-secretory and reserpine-induced anti-ulcer activity tests at a dose of 100 mg./kg., produced at 45% reduction in the pH of gastric fluid and a 100% reduction in the ulcer score.

EXAMPLE 28

Reaction of 2,5-hexanedione with one molar equivalent of 3-aminopyridine in the presence of a p-toluenesulfonic acid in benzene; reaction of the resulting 1-(3-pyridyl)-2,5-dimethylpyrrole with a molar excess of 2-amino-2-methylpropionitrile in the presence of a molar excess of trifluoroacetic acid in refluxing glacial acetic acid; and hydrolysis in dilute sulfuric acid of the resulting 2-(3-pyridyl)-2,4,5,6-tetrahydro-1,3,4,6,6-pentamethylcyclopenta[c]pyrrole-4-carbonitrile, all as described above in Example 27, affords 2-(3-pyridyl)-2,4,5,6-tetrahydro-1,3,4,6,6-pentamethylcyclopenta[c]pyrrole-4-carboxamide.

EXAMPLE 29

Reaction of 2-(2-pyridyl)-2,4,5,6-tetrahydro-1,3,4,6,6-pentamethylcyclopenta[c]pyrrole-4-carbonitrile, described above in Example 27, in an autoclave at 150°–160°C. with an ethanol solution saturated with anhydrous ammonia and anhydrous hydrogen sulfide affords 2-(2-pyridyl)-2,4,5,6-tetrahydro-1,3,4,6,6-pentamethylcyclopenta[c]pyrrole-4-thiocarboxamide.

EXAMPLE 30

Reaction of 2-(2-pyridyl)-2,4,5,6-tetrahydro-1,3,4,6,6-pentamethylcyclopenta[c]pyrrole-4-carboxamide, described above in Example 27, with one molar equivalent of sodium hydride in refluxing toluene, and reaction of the resulting sodium salt with one molar equivalent of methyl iodide affords 2-(2-pyridyl)-2,4,5,6-tetrahydro-1,3,4,6,6-pentamethylcyclopenta[c]pyrrole-4-N-methylcarboxamide.

EXAMPLE 31

Reaction of 2-(2-pyridyl)-2,4,5,6-tetrahydro-1,3,4,6,6-pentamethylcyclopenta[c]pyrrole-4-N-methylcarboxamide, described above in Example 30, with one molar equivalent of sodium hydride in refluxing toluene, and reaction of the resulting sodium salt with methyl iodide affords 2-(2-pyridyl)-2,4,5,6-tetrahydro-1,3,4,6,6-pentamethylcyclopenta[c]pyrrole-4-N,N-dimethylcarboxamide.

EXAMPLE 32

A mixture of 114 g. (1.0 mole) of 2,5-hexanedione, 108.2 g. (1.0 mole) of 3-methylaniline and a small amount of p-toluenesulfonic acid in 600 ml. of benzene was refluxed under a Dean-Stark trap using the procedure described above in Example 4. The product was purified by distillation in vacuo to give 158 g. of 1-(3-methylphenyl)-2,5-dimethylpyrrole, b.p. 78°–80°C./0.05 mm.

A mixture of 100 g. (0.54 mole) of 1-(3-methylphenyl)-2,5-dimethylpyrrole, 100 g. (1.19 moles) of 2-amino-2-methylpropionitrile and 90 ml. (1.19 moles) of trifluoroacetic acid in 425 ml. of glacial acetic acid was heated under reflux for two and one half hours and worked up in the same manner described above in Example 11. The crude product was recrystallized from acetonitrile to give 95 g. of 2-(3-methylphenyl)-2,4,5,6-tetrahydro-1,3,4,6,6-pentamethylcyclopenta[c]pyrrole-4-carbonitrile.

The latter (60 g., 0.21 mole) was hydrolyzed in a solution of 205 ml. of sulfuric acid and 21 ml. of water using the procedure described above in Example 1. The crude product was recrystallized once from isopropanol, once from acetonitrile and once from methanol to give 27.4 g. of 2-(3-methylphenyl)-2,4,5,6-tetrahydro-1,3,4,6,6-pentamethylcyclopenta[c]pyrrole-4-carboxamide, m.p. 149.5°–151.5°C.

The latter compound, when administered orally to rats in the anti-secretory and reserpine-induced anti-ulcer activity tests at a dose of 100 mg./kg., produced at 20% reduction of the pH of gastric fluid and an 80% decrease in the ulcer score.

EXAMPLE 33

A mixture of 114 g. (1.0 mole) of 2,5-hexanedione, 127.5 g. (1.0 mole) of 2-chloroaniline and a small amount of p-toluenesulfonic acid in about 600 ml. of benzene was refluxed under a water separator using the procedure described above in Example 1. The product was distilled in vacuo to give 174 g. of 1-(2-chlorophenyl)-2,5-dimethylpyrrole, b.p. 84°–94°C./0.05 mm.

A mixture of 92 g. (0.45 mole) of 1-(2-chlorophenyl)-2,5-dimethylpyrrole, 82.5 g. (0.98 mole) of 2-amino-2-methylpropionitrile and 112 g. (0.98 mole) of trifluoroacetic acid in 350 ml. of glacial acetic acid was heated under reflux for about 6 hours and then worked up in the manner described above in Example 11 to give 117 g. of crude 2-(2-chlorophenyl)-2,4,5,6-tetrahydro-1,3,4,6,6-pentamethylcyclopenta[c]pyrrole-4-carbonitrile as a dark red-brown gum which could not be crystallized.

The latter (116 g., 0.37 mole) was hydrolyzed in a solution of 370 ml. of concentrated sulfuric acid and 37 ml. of water using the procedure described above in Example 1. The product was recrystallized once from acetonitrile and 3 times from methanol to give 14.7 g. of 2-(2-chlorophenyl)-2,4,5,6-tetrahydro-1,3,4,6,6-pentamethylcyclopenta[c]pyrrole-4-carboxamide, m.p. 181°–183°C.

The latter compound, when administered orally to rats in the anti-secretory activity test at a dose of 100 mg./kg., produced a 16% reduction in the pH of gastric fluid.

EXAMPLE 34

A mixture of 114 g. (1.0 mole) of 2,5-hexanedione, 108 g. (1.0 mole) of 2-methylaniline and a small amount of p-toluenesulfonic acid in 600 ml. of benzene was refluxed under a water separator until no further water was produced, and the mixture was worked up in the manner described above in Example 4. There was thus obtained 143 g. of 1(2-methylphenyl)-2,5-dimethylpyrrole, b.p. 117°–119°C./0.05 mm.

A mixture of 93 g. (0.5 mole) of 1-(2-methylphenyl)-2,5-dimethylpyrrole, 92.5 g. (1.1 moles) of 2-amino-2-methylpropionitrile and 125 g. (1.1 moles) of trifluoroacetic acid in 375 ml. of glacial acetic acid was heated under reflux for 2 hours and then worked up in the manner described above in Example 11. The product was purified by distillation in vacuo to give 102.5 g. of 2-(2-methylphenyl)-2,4,5,6-tetrahydro-1,3,4,6,6-pentamethylcyclopenta[c]pyrrole-4-carbonitrile, b.p. 139°–142°C./0.25–0.30 mm.

The latter (100 g., 0.34 mole) was hydrolyzed in a solution of 340 ml. of concentrated sulfuric acid and 34 ml. of water using the procedure described above in Example 1. The crude product was recrystallized twice from acetonitrile and once from methanol to give 28 g. of 2-(2-methylphenyl)-2,4,5,6-tetrahydro-1,3,4,6,6-pentamethylcyclopenta[c]pyrrole-4-carboxamide, m.p. 159°–161°C.

The latter compound, when administered orally to rats in the anti-secretory activity test at a dose of 100 mg./kg., produced a 27% reduction in the pH of gastric fluid.

EXAMPLE 35

A mixture of 114 g. (1.0 mole) of 2,5-hexanedione, 111 g. (1.0 mole) of 4-fluoroaniline and a small amount of p-toluenesulfonic acid in 600 ml. of benzene was refluxed under a water separator until no further water was produced, and the reaction was worked up in the manner described above in Example 4. There was thus obtained 155 g. of 1-(4-fluorophenyl)-2,5-dimethylpyrrole, b.p. 116°–120°C./15 mm.

A mixture of 94 g. (0.5 mole) of 1-(4-fluorophenyl)-2,5-dimethylpyrrole, 92 g. (1.1 moles) of 2-amino-2-methylpropionitrile and 81.5 ml. (1.1 moles) of trifluoroacetic acid in 400 ml. of glacial acetic acid was refluxed for three hours and then worked up in the manner described above in Example 11. The product was recrystallized from isopropanol to give 88 g. of 2-(4-fluorophenyl)-2,4,5,6-tetrahydro-1,3,4,6,6-pentamethylcyclopenta[c]pyrrole-4-carbonitrile.

The latter (88 g., 0.29 mole) was hydrolyzed in a solution of 290 ml. of concentrated sulfuric acid and 29 ml. of water using the procedure described above in Example 1. The crude product was recrystallized 2 times from acetonitrile and once from isopropanol to give 54 g. of 2-(4-fluorophenyl)-2,4,5,6-tetrahydro-1,3,4,6,6-pentamethylcyclopenta[c]pyrrole-4-carboxamide, m.p. 150°–151°C.

In anti-secretory and reserpine-induced anti-ulcer activity tests, the latter compound, on oral administration to rats at a dose of 100 mg./kg., produced a 47% reduction in the pH of gastric fluid and a 90% reduction in ulcer score.

EXAMPLE 36

A mixture of 57 g. (0.5 mole) of 2,5-hexanedione, 104.5 g. (0.5 mole) of 4-dimethylaminoaniline dihydrochloride and 240 ml. (1.5 mole) of triethylamine in 500 ml. of benzene was refluxed under a water separator until no further water was produced, and the reaction mixture was worked up in the manner described above in Example 4. The crude product thus obtained was recrystallized from methanol to give 79 g. of 1(4-dimethylaminophenyl)-2,5-dimethylpyrrole.

A mixture of 57 g. (0.27 mole) of 1-(4-dimethylaminophenyl)-2,5-dimethylpyrrole, 49 g. (0.59 mole) of 2-amino-2-methylpropionitrile and 66.5 g. (0.59 mole) of trifluoroacetic acid in 250 ml. of glacial acetic acid was heated under reflux for 3 hours and then worked up in the manner described above in Example 11. The crude product was recrystallized from methanol to give 54 g. of 2-(4-dimethylaminophenyl)-2,4,5,6-tetrahydro-1,3,4,6,6-pentamethylcyclopenta[c]pyrrole-4-carbonitrile.

In two separate runs, 32.1 g. (0.10 mole) portions of the latter were hydrolyzed in a solution of 100 ml. of concentrated sulfuric acid and 10 ml. of water using the procedure described above in Example 1. The combined crude products were recrystallized twice from dimethylformamide to give 31.5 g. of 2-(4-dimethylaminophenyl)-2,4,5,6-tetrahydro-1,3,4,6,6-pentamethylcyclopenta[c]pyrrole-4-carboxamide, m.p. 238°–241°C.

In the anti-secretory activity test, the latter compound administered orally to rats at a dose of 100 mg./kg., produced a 9% reduction in the pH of gastric fluid.

EXAMPLE 37

A mixture of 114 g. (1.0 mole) of 2,5-hexanedione, 109 g. (1.0 mole) of 4-aminophenol and 1 g. of p-toluenesulfonic acid monohydrate in 600 ml. of benzene was refluxed under a water separator until no further water was given off and then worked up in the manner described above in Example 4. The crude product was distilled in vacuo to give 161 g. of 1-(4-hydroxyphenyl)-2,5-dimethylpyrrole, b.p. 121°–138°C./0.05–0.5 mm., which solidified on standing to give material having m.p. 102°–105°C.

A mixture of 155 g. (0.83 mole) of 1-(4-hydroxyphenyl)-2,5-dimethylpyrrole, 153 g. (1.83 moles) of 2-amino-2-methylpropionitrile and 138 ml. (1.83 moles) of trifluoroacetic acid in 580 ml. of glacial acetic acid was heated under reflux for three hours and worked up in the manner described above in Example 11. The crude product was isolated as a pale gray, off-white solid after slurrying with ethyl acetate to give 157 g. of 2-(4-hydroxyphenyl)-2,4,5,6-tetrahydro-1,3,4,6,6-pentamethylcyclopenta[c]pyrrole-4-carbonitrile.

The latter (88.2 g., 0.3 mole) was hydrolyzed in a solution of 300 ml. of concentrated sulfuric acid and 30 ml. of water and the reaction worked up in the manner described above in Example 1. The crude product was recrystallized from methanol to give 31.7 g. of 2-(4-hydroxyphenyl)-2,4,5,6-tetrahydro-1,3,4,6,6-pentamethylcyclopenta[c]pyrrole-4-carboxamide, m.p. 249°–251°C.

In anti-secretory and anti-ulcer activity tests, the latter compound when administered orally to rats at doses of 50 and 100 mg./kg. produced, respectively, 32 and 64% reduction in the pH of gastric fluids and 100% reduction in ulcer score at both doses.

EXAMPLE 38

A mixture of 114 g. (1.0 mole) of 2,5-hexanedione, 150.2 g. (1.0 mole) of 4-acetylaminoaniline and a small amount of p-toluenesulfonic acid in benzene was refluxed under a water separator until no further water was produced, and the reaction mixture worked up in the manner described above in Example 4. The crude product thus obtained was recrystallized from methanol to give 169 g. of 1-(4-acetylaminophenyl)-2,5-dimethylpyrrole.

A mixture of 68 g. (0.3 mole) of 1-(4-acetylaminophenyl)-2,5-dimethylpyrrole, 55.5 g. (0.66 mole) of 2-amino-2-methylpropionitrile, and 75 g. (0.66 mole) of trifluoroacetic acid in 250 ml. of glacial acetic acid was heated under reflux for 5 hours and then worked up in the manner described above in Example 11. The crude product thus obtained was recrystallized from acetonitrile to give 47 g. of 2-(4-acetylaminophenyl)-2,4,5,6-tetrahydro-1,3,4,6,6-pentamethylcyclopenta[c]pyrrole-4-carbonitrile.

The latter (55 g., 0.17 mole) was hydrolyzed in a solution of 220 ml. of concentrated sulfuric acid and 22 ml. of water using the procedure described above in Example 1. The crude product was recrystallized twice from aqueous methanol to give 22 g. of 2-(4-acetylaminophenyl)-2,4,5,6-tetrahydro-1,3,4,6,6-pentamethylcyclopenta[c]pyrrole-4-carboxamide, m.p. 236°–239°C.

In anti-secretory and reserpine-induced anti-ulcer activity tests, the latter compound, when administered orally to rats at a dose of 100 mg./kg., produced a 20% reduction of the pH of gastric fluid and a 20% decrease in ulcer score.

EXAMPLE 39

To a solution of 20.2 g. (0.1 mole) of 2,4,5,6-tetrahydro-1,3,4,6,6-pentamethylcyclopenta[c]pyrrole-4-carbonitrile, described above in Example 2, in 100 ml. of dioxane was added 5.6 g. (0.11 mole) of acrylonitrile and 6.4 ml. of a 35% solution of benzyltrimethyl ammonium hydroxide (Triton B) in methanol, and the mixture was stirred at room temperature under nitrogen overnight. The mixture was then poured into ice water, acidified with dilute hydrochloric acid, and the solid which separated was washed with water, dried and recrystallized from ethanol to give 14.8 g. of 2-(2-cyanoethyl)-2,4,5,6-tetrahydro-[1,3,4,6,6-pentamethylcyclopenta[c]pyrrole-4-carbonitrile, m.p. 169°–170°C.

The latter 23.9 g. (0.09 mole) was hydrolyzed in 200 ml. of concentrated sulfuric acid using the procedure described above in Example 1. The product thus obtained was recrystallized from acetone to give 4.3 g. of 2-(2-carboxamidoethyl)-2,4,5,6-tetrahydro-1,3,4,6,6-pentamethylcyclopenta[c]pyrrole-4-carboxamide, m.p. 130.5°–133°C.

In anti-secretory activity tests, the latter compound, when administered orally to rats at a dose of 100 mg./kg., produced a 5% reduction in the pH of gastric fluid.

EXAMPLE 40

A solution of 12.6 g. (0.3 mole) of sodium hydride in 275 ml. of dimethylsulfoxide was prepared by warming the mixture. To the solution was added dropwise with stirring a solution of 40.4 g. (0.2 mole) of 2,4,5,6-tetrahydro-1,3,4,6,6-pentamethylcyclopenta[c]pyrrole-4-carbonitrile (described above in Example 2) in 100 ml. of dimethylsulfoxide. The mixture was then treated dropwise with stirring with 41.5 g. (0.3 mole) of n-butyl bromide, and the mixture was heated for 5 hours on a steam bath, cooled to room temperature and poured into ice water with stirring. The gummy solid which separated was taken into ether, the ether solution washed first with water, then with saturated brine, dried, and evaporated to dryness in vacuo to give a dark oil which solidified on cooling. The latter was recrystallized from pentane to give 34.3 g. of 2-butyl-2,4,5,6-tetrahydro-1,3,4,6,6-pentamethylcyclopenta[c]pyrrole-4-carbonitrile, m.p. 53°–55°C.

The latter (30.7 g., 0.12 mole) was hydrolyzed with a solution of 150 ml. of concentrated sulfuric acid and 15 ml. of water using the procedure described above in Example 1. The crude product was recrystallized twice from cyclohexane to give 7.8 g. of 2-butyl-2,4,5,6-tetrahydro-1,3,4,6,6-pentamethylcyclopenta[c]pyrrole-4-carboxamide, m.p. 135°–137°C.

EXAMPLE 41

A solution of 57.0 g. (0.5 mole) of 2,5-hexanedione, 29.5 g. (0.55 mole) of isopropylamine, and 1.0 g. of p-toluenesulfonic acid in 300 ml. of benzene was refluxed and stirred under a water separator using the procedure described above in Example 4. There was thus obtained 49.7 g. of 1-isopropyl-2,5-dimethylpyrrole, b.p. 80°–82.5°C./17 mm.

The latter (49.7 g., 0.36 mole), 66.4 g. (0.79 mole) of 2-amino-2-methylpropionitrile and 90 g. (0.79 mole) of trifluoroacetic acid in 200 ml. of glacial acetic acid was heated under reflux for 5 hours and worked up using the procedure described above in Example 11. The crude product was recrystallized from hexane to give 25.6 g. of 2-isopropyl2,4,5,6-tetrahydro-1,3,4,6,6-pentamethylcyclopenta[c]pyrrole-4-carbonitrile, m.p. 76°–80°C.

The latter (25.6 g., 0.11 mole) was hydrolyzed with a solution of 100 ml. of concentrated sulfuric acid and 10 ml. of water using the procedure described above in Example 1. The crude product was recrystallized twice from cyclohexane to give 13.5 g. of 2-isopropyl-2,4,5,6-tetrahydro-1,3,4,6,6-pentamethylcyclopenta[c]pyrrole-4-carboxamide, m.p. 156°–158°C.

EXAMPLE 42

A solution of 62.7 g. (0.55 mole) of 2,5-hexanedione, 44.5 g. (0.5 mole) of 2-ethoxyethylamine and 1.0 g. of toluenesulfonic acid in 300 ml. of benzene was refluxed under a water separator using the procedure described above in Example 4. There was thus obtained 67.1 g. of 1-(2-ethoxyethyl)-2,5-dimethylpyrrole, b.p. 105°–108.5°C., $n_D^{26}$ 1.4845.

A solution of the latter (66.1 g., 0.40 mole), 86 g. (0.87 mole) of 2-amino-2-methylpropionitrile and 99.4 g. (0.87 mole) of trifluoroacetic acid in 250 ml. of glacial acetic acid was heated under reflux using the procedure described above in Example 11. There was thus obtained 103.1 g. of 2-(2-ethoxyethyl)-2,4,5,6-tetrahydro-1,3,4,6,6-pentamethylcyclopenta[c]pyrrole-4-carbonitrile.

The latter (103.1 g., 0.39 mole) was hydrolyzed with a solution of 400 ml. of concentrated sulfuric acid and 40 ml. of water using the procedure described above in Example 1. The crude product was recrystallized twice from hexane to give 21.5 g. of 2-(2-ethoxyethyl)-2,4,5,6-tetrahydro-1,3,4,6,6-pentamethylcyclopenta[c]pyrrole-4-carboxamide, m.p. 109°–111°C.

EXAMPLE 43

Reaction of 2,5-hexanedione with 2-ethylmercaptoethylamine in benzene in the presence of p-toluenesulfonic acid; reaction of the resulting 1-(2-ethylmercaptoethyl)-2,5-dimethylpyrrole with 2-amino-2-methylpropionitrile in the presence of trifluoroacetic acid in glacial acetic acid; and hydrolysis with dilute sulfuric acid of the resulting 2-(2-ethylmercaptoethyl)-2,4,5,6-tetrahydro-1,3,4,6,6-pentamethylcyclopenta[c]pyrrole-4-carbonitrile, all according to the procedure described above in Example 42, affords 2-(2-ethylmercaptoethyl)-2,4,5,6-tetrahydro-1,3,4,6,6-pentamethylcyclopenta[c]pyrrole-4-carboxamide.

EXAMPLE 44

A solution of 27.8 g. (0.1 mole) of 2-phenyl-2,4,5,6-tetrahydro-1,3,4,6,6-pentamethylcyclopenta[c]pyrrole-4-carbonitrile (described above in Example 13) dissolved in 400 ml. of diethyl ether was cooled to 0°C. and treated dropwise with stirring with a solution of 81.0 g. (0.6 mole) of sulfuryl chloride in 100 ml. of diethyl ether, and the solution was stirred at room temperature for several hours. The mixture was then poured into ice water, extracted with ether, and the combined ether extracts dried and taken to dryness to give 42 g. of a gummy solid which was triturated with hot diethyl ether to give 23.5 g. of 2-phenyl-2,4,5,6-tetrahydro-1,3-bis-dichloromethyl-4,6,6-trimethylcyclopenta[c]pyrrole-4-carbonitrile, m.p. 186°–188.5°C.

A solution of the latter (36.0 g., 0.087 mole) dissolved in 400 ml. of 50% aqueous ethanol was refluxed for one hour and then cooled. The solid which separated was collected and dissolved in chloroform, and the organic solution washed once with water and once with saturated sodium bicarbonate, dried, and taken to dryness to give 28 g. of crude material which was recrystallized from isopropanol to give 19.8 g. of 2-phenyl-2,4,5,6-tetrahydro-1,3-diformyl-4,6,6-trimethylcyclopenta[c]pyrrole-4-carbonitrile, m.p. 135°–136.5°C.

Hydrolysis of 1.0 g. of the latter with 5 ml. of dilute sulfuric acid using the procedure described above in Example 1 gave 2-phenyl-2,4,5,6-tetrahydro-1,3-diformyl-4,6,6-trimethylcyclopenta[c]pyrrole-4-carboxamide, m.p. 164.5°–166.5°C. (recrystallized from methanol).

EXAMPLE 45

A solution of 69.5 g. (0.5 mole) of glycine ethyl ester hydrochloride, 62.7 g. (0.55 mole) of 2,5-hexanedione and 50.5 g. (0.5 mole) of triethylamine in 500 ml. of benzene was refluxed under a water separator using the procedure described above in Example 4 to give 73.9 g. of ethyl-2,5-dimethylpyrrole-1-acetate, b.p. 125°–127°C./13 mm., $n_D^{23}$ 1.4903.

A solution of the latter (72.4 g., 0.4 mole), 75 g. (0.89 mole) of 2-amino-2-methylpropionitrile and 101.5 g. (0.8 mole) of trifluoroacetic acid in 250 ml. of glacial acetic acid was heated under reflux using the procedure described above in Example 11. The crude product was recrystallized once from hexane and once from cyclohexane to give 55.3 g. of ethyl 4-cyano-2,4,5,6-tetrahydro-1,3,4,6,6-pentamethylcyclopenta[c]pyrrole-2-acetate, m.p. 60°–62°C.

The latter (55.0 g., 0.19 mole) was hydrolyzed with a solution of 200 ml. of concentrated sulfuric acid and 20 ml. of water using the procedure described above in Example 1. The crude product was recrystallized once from cyclohexane to give 33.5 g. of purified material, 12 g. of which was recrystallized again from diethyl ether/ethanol to give 3.3 g. of ethyl 4-carbamoyl-2,4,5,6-tetrahydro-1,3,4,6,6-pentamethylcyclopenta[c]pyrrole-2-acetate, m.p. 138°–140°C.

EXAMPLE 46

Reaction of 2,5-hexanedione with 4-bromoaniline in a benzene solvent in the presence of an acid catalyst; reaction of the resulting 1-(4-bromophenyl)-2,5-dimethylpyrrole with 2-amino-2-methylpropionitrile and trifluoroacetic acid in glacial acetic acid; and hydrolysis of the resulting 2-(4-bromophenyl)-2,4,5,6-cyclopenta[c]pyrrole-4-carbonitrile with dilute sulfuric acid, all according to the procedure described above in Example 13, affords 2-(4-bromophenyl)-2,4,5,6-tetrahydro-1,3,4,6,6-pentamethylcyclopenta[c]pyrrole-4-carboxamide.

EXAMPLE 47

Reaction of 2,5-hexanedione with 2,4,6-trichloroaniline in benzene in the presence of an acid catalyst; reaction of the resulting 1-(2,4,6-trichlorophenyl)-2,5-dimethylpyrrole with 2-amino-2-methylpropionitrile and trifluoroacetic acid; and hydrolysis of the resulting 2-(2,4,6-trichlorophenyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(2,4,6-trichlorophenyl)-2,4,5,6-tetrahydro-1,3,4,6,6-pentamethylcyclopenta[c]pyrrole-4-carboxamide.

EXAMPLE 48

Reaction of 2,5-hexanedione with 2-chloro-4-methylaniline in benzene in the presence of an acid catalyst; reaction of the resulting 1-(2-chloro-4-methylphenyl)-2,5-dimethylpyrrole with 2-amino-2-methylpropionitrile and trifluoroacetic acid; and hydrolysis of the resulting 2-(2-chloro-4-methylphenyl)-2,4,5,6-tetrahydro-1,3,4,6,6-pentamethycyclopenta[c]pyrrole4-carbonitrile with dilute sulfuric acid, all according to the procedure described above in Example 13, affords 2-(2-chloro-4-methylphenyl)-2,4,5,6-tetrahydro-1,3,4,6,6-pentamethylcyclopenta[c]pyrrole-4-carboxamide.

EXAMPLE 49

Reaction of 2,5-hexanedione with 3,4-methylenedioxyaniline in benzene in the presence of an acid catalyst; reaction of the resulting 1-(3,4-methylenedioxyphenyl)-2,5-dimethylpyrrole with 2-amino-2-methylpropionitrile and trifluoroacetic acid; and hydrolysis of the resulting 2-(3,4-methylenedioxyphenyl)-2,4,5,6-tetrahydro-1,3,4,6,6-pentamethylcyclopenta[c]pyrrole-4-carbonitrile, with dilute sulfuric acid, all according to the procedure described above in Example 13, affords 2-(3,4-methylenedioxyphenyl)-2,4,5,6-tetrahydro-1,3,4,6,6-pentamethylcyclopenta[c]pyrrole-4-carboxamide.

EXAMPLE 50

Reaction of 2,5-hexanedione with 4-trifluoromethylaniline in benzene in the presence of an acid catalyst; reaction of the resulting 1-(4-trifluoromethylphenyl)-2,5-dimethylpyrrole with 2-amino-2-methylpropionitrile and trifluoroacetic acid; and hydrolysis of the resulting 2-(4-trifluoromethylphenyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(4-trifluoromethylphenyl)-2,4,5,6-tetrahydro-1,3,4,6,6-pentamethylcyclopenta[c]pyrrole-4-carboxamide.

EXAMPLE 51

Reaction of 2,5-hexanedione with 2,4,6-trimethylaniline in benzene in the presence of an acid catalyst; reaction of the resulting 1-(2,4,6-trimethylphenyl)-2,5-dimethylpyrrole with 2-amino-2-methylpropionitrile and trifluoroacetic acid; and hydrolysis of the resulting 2-(2,4,6-trimethylphenyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(2,4,6-trimethylphenyl)-2,4,5,6-tetrahydro-1,3,4,6,6-pentamethylcyclopenta[c]pyrrole-4-carboxamide.

EXAMPLE 52

Reaction of the ethyl 4-carbamoyl-2,4,5,6-tetrahydro-1,3,4,6,6-pentamethylcyclopenta[c]pyrrole-2-acetate described above in Example 45 with alcoholic sodium hydroxide and isolation of the product from an acid or neutral medium affords 4-carbamoyl-2,4,5,6-tetrahydro-1,3,4,6,6-pentamethylcyclopenta[c]pyrrole-2-acetic acid.

EXAMPLE 53

A mixture of 114 g. (1.0 mole) of 2,5-hexanedione, 99 g. (1.0 mole) of cyclohexylamine and a small amount of p-toluenesulfonic acid in 600 ml. of benzene was refluxed under a water separator and the mixture then worked up using the procedure described above in Example 4. There was thus obtained 132 g. of 1-cyclohexyl-2,5-dimethylpyrrole, b.p. 83°–89°C./0.02 mm.

A mixture of 88 g. (0.5 mole) of the latter, 92 g. (1.10 mole) of 2-amino-2-methylpropionitrile and 125 g. (1.1 moles) of trifluoroacetic acid in 400 ml. of glacial acetic acid was heated under reflux for 2 and ½ hours and worked up in the manner described in Example 11. The product obtained was recrystallized from isopropanol to give 81 g. of 2-cyclohexyl-2,4,5,6-tetrahydro-1,3,4,6,6-pentamethylcyclopenta[c]pyrrole-4-carbonitrile.

The latter (81 g., 0.27 mole) was hydrolyzed in a solution of 280 ml. of concentrated sulfuric acid and 28 ml. of water using the procedure described above in Example 1. The product was recrystallized once from acetonitrile and once from isopropanol to give 31 g. of 2-cyclohexyl-2,4,5,6-tetrahydro-1,3,4,6,6-pentamethylcyclopenta[c]pyrrole-4-carboxamide, m.p. 125°–150°C.

The latter, administered orally in rats at doses of 50 mg./kg. and 100 mg./kg in the anti-secretory activity test, produced, respectively, 11% and 16% reduction in the pH of gastric fluid.

EXAMPLE 54

Reaction of 3,6-octanedione with aniline in refluxing benzene in the presence of an acid catalyst; reaction of the resulting 1-phenyl-2,5-diethylpyrrole with 2-amino-2-methylpropionitrile and trifluoroacetic acid; and acid hydrolysis of the resulting 2-phenyl-2,4,5,6-tetrahydro-1,3-diethyl-4,6,6-trimethylcyclopenta[c]pyrrole-4-carbonitrile with dilute sulfuric acid all according to the procedure described above in Example 13 affords 2-phenyl-2,4,5,6-tetrahydro-1,3-diethyl-4,6,6-trimethylcyclopenta[c]pyrrole-4-carboxamide.

EXAMPLE 55

Reaction of 4,7-decanedione with aniline in refluxing benzene in the presence of an acid catalyst; reaction of the resulting 1-phenyl-2,5-dipropylpyrrole with 2-amino-2-methylpropionitrile and trifluoroacetic acid; and hydrolysis of the resulting 2-phenyl-2,4,5,6-tetrahydro-1,3-dipropyl-4,6,6-trimethylcyclopenta[c]pyrrole-4-carbonitrile with dilute sulfuric acid, all according to the procedure described above in Example 13, affords 2-phenyl-2,4,5,6-tetrahydro-1,3-dipropyl-4,6,6-trimethylcyclopenta[c]pyrrole-4-carboxamide.

EXAMPLE 56

Reaction of 2,7-dimethyl-3,6-octanedione with aniline in refluxing benzene in the presence of an acid catalyst; reaction of the resulting 1-phenyl-2,5-diisopropylpyrrole with 2-amino-2-methylpropionitrile and trifluoroacetic acid; and hydrolysis of the resulting 2-phenyl-2,4,5,6-tetrahydro-1,3-diisopropyl-4,6,6-trimethylcyclopenta[c]pyrrole-4-carbonitrile with dilute sulfuric acid, all according to the procedure described above in Example 13, affords 2-phenyl-2,4,5,6-tetrahydro-1,3-diisopropyl-4,6,6-trimethylcyclopenta[c]pyrrole-4-carboxamide.

EXAMPLE 57

Reaction of 5,8-dodecanedione with aniline in refluxing benzene in the presence of an acid catalyst; reaction of the resulting 1-phenyl-2,5-dibutylpyrrole with 2-amino-2-methylpropionitrile and trifluoroacetic acid; and hydrolysis of the resulting 2-phenyl-2,4,5,6-tetrahydro-1,3-dibutyl-4,6,6-trimethylcyclopenta[c]pyrrole-4-carbonitrile with dilute sulfuric acid, all according to the procedure described above in Example 13, affords 2-phenyl-2,4,5,6-tetrahydro-1,3-dibutyl-4,6,6-trimethylcyclopenta[c]pyrrole-4-carboxamide.

EXAMPLE 58

1-Phenyl-2,5-dimethylpyrrole, described above in Example 13 (124 g., 0.74 mole), in 200 ml. of ethylene dichloride was reacted with 58.4 g. (0.8 mole) of dimethylformamide and 123 g. (0.8 mole) of phosphorus oxychloride in the presence of 550 g. (4.0 moles) of sodium acetate trihydrate in 720 ml. of water using the procedure described in Organic Syntheses, Coll. Vol. 4, page 831 (1963), John Wiley and Sons, New York. The crude product was recrystallized from methanol to give 112.5 g. of 1-phenyl-2,5-dimethyl-3-formylpyrrole, m.p. 89°–91°C.

A suspension of 26.2 g. (0.62 mole) of a 57% mineral oil dispersion of sodium hydride in 200 ml. of dimethylformamide was prepared and treated portionwise with 116 g. (0.59 mole) of diethyl phosphonoacetonitrile in 100 ml. of dimethylformamide. When the exothermic reaction had subsided, the mixture was treated with a solution of 112.5 g. (0.57 mole) of the abovedescribed 1-phenyl-2,5-dimethyl-3-formylpyrrole in 600 ml. of dimethylformamide. When the reaction had subsided, the reaction mixture was poured into water, filtered, and the solid material recrystallized from methanol to give 61.5 g. of 1-phenyl-2,5-dimethylpyrrole-3-acrylonitrile, m.p. 145°–147.5°C.

The latter (10.0 g., 0.045 mole) dissolved in 250 ml. of methanol was reduced under an initial hydrogen pressure of 50 pounds psi at room temperature over 2 g. of a 10% palladium-on-charcoal catalyst. When reduction was complete, the catalyst was removed by filtration, the filtrate taken to dryness, and the solid residue recrystallized from cyclohexane to give 6.65 g. of 3-(1-phenyl-2,5-dimethyl-3-pyrrole)propionitrile, m.p. 83.5°–85.5°C.

The latter (5.6 g., 0.025 mole) dissolved in 100 ml. of a 1:1 solution of tetrahydrofuran and diethyl ether was added to a solution of 14 ml. (0.3 mole) of a 2.2 molar solution of methyllithium is diethyl ether. The mixture was heated for two hours, cooled, treated with 3.5 g. of solid ammonium chloride, stirred for 20 minutes at room temperature, then filtered, and the filtrate taken to dryness to give a yellowbrown oil consisting of crude 4-(1-phenyl-2,5-dimethyl-3-pyrrole)- 2-iminobutane. The latter was treated with a slurry of 3.5 g. (0.045 mole) of ammonium acetate and 3.2 g. (0.045 mole) of potassium cyanide in 20 ml. of glacial acetic acid and the mixture stirred under nitrogen at reflux overnight. The mixture was then poured into ice water and the dark brown gum which separated was extracted with diethyl ether, the extracts washed with water, then with aqueous sodium bicarbonate and brine, then dried over sodium sulfate and evaporated to dryness giving 4.2 g. of a brown gum whose nmr spectrum showed the presence of 2-phenyl-2,4,5,6-tetrahydro-1,3,4-trimethylcyclopenta[c]pyrrole-4-carbonitrile. The latter on hydrolysis with dilute sulfuric acid, using the procedure described above in Example 1, affords 2-phenyl-2,4,5,6-tetrahydro-1,3,4-trimethylcyclopenta[c]pyrrole-4-carboxamide.

EXAMPLE 59

1,2,5-Trimethylpyrrole (109 g., 1.0 mole) in 250 ml. of ethylene dichloride was reacted with 80 g. (1.1 moles) of dimethylformamide and 169 g. (1.1 moles) of phosphorus oxychloride in the presence of 750 g. (5.5 moles) of sodium acetate trihydrate in one liter of water using the procedure described in Organic Syntheses, Coll. Vol. 4, page 831, (1963) John Wiley and Sons, New York, and the crude product was recrystallized from acetonitrile to give 71.1 g. of 1,2,5-trimethyl-3-formylpyrrole, m.p. 97°–99°C.

A suspension of 9.3 g. (0.22 mole) of a 57% mineral oil dispersion of sodium hydride in 200 ml. of anhydrous 1,2-dimethoxyethane was treated dropwise with 37.5 g. (0.2 mole) of diethyl phosphonoacetonitrile, and the mixture was stirred until evolution of hydrogen had ceased. The resulting solution was then treated with a solution of 27.4 g. (0.2 mole) of the above 1,2,5-trimethyl- 3-formylpyrrole in 250 ml. of 1,2-dimethoxyethane. When the exothermic reaction had subsided, the mixture was heated to 80°C., then allowed to cool to room temperature, diluted with 100 ml. of dimethylformamide, heated to reflux, then cooled and poured into ice water. The solid which separated was collected and recrystallized from methanol to give 14 g. of 1,2,5-trimethylpyrrole-3-acrylonitrile, m.p. 148.5°–150.5°C.

Reduction of the latter with hydrogen over a palladium-on-charcoal catalyst; reaction of the resulting 3-(1,2,5-trimethyl-3-pyrrole)propionitrile with methyl lithium; and cyclization of the resulting 3-(1,2,5-trimethyl-3-pyrrole)-1-iminobutane in glacial acetic acid in the presence of ammonium acetate and potassium cyanide using the procedure described above in Example 58 affords 2,4,5,6-tetrahydro-1,2,3,4-tetramethylcyclopenta[c]pyrrole-4-carbonitrile, which on hydrolysis with dilute sulfuric acid using the procedure described above in Example 1 affords 2,4,5,6-tetrahydro-1,2,3,4-tetramethylcyclopenta[c]pyrrole-4-carboxamide.

EXAMPLE 60

A mixture of 25.3 g. (0.078 mole) of 2-(4-acetylaminophenyl)-2,4,5,6-tetrahydro-1,3,4,6,6-pentamethylcyclopenta[c]pyrrole-4-carbonitrile, described above in Example 38, and 7.5 g. (0.12 mole) of 86% aqueous potassium hydroxide in 20 ml. of water and 400 ml. of ethylene glycol was heated under reflux with stirring overnight and the mixture then poured into an ice/water mixture. The solid which separated was collected and recrystallized from isopropanol to give 7 g. of 2-(4-aminophenyl)-2,4,5,6-tetrahydro-1,3,4,6,6-pentamethylcyclopenta[c]pyrrole-4-carbonitrile, m.p. 175°–183°C.

Hydrolysis of the latter in 90% sulfuric acid using the procedure described above in Example 1 affords 2-(4-aminophenyl)-2,4,5,6-tetrahydro-1,3,4,6,6-pentamethylcyclopenta[c]pyrrole-4-carboxamide.

EXAMPLE 61

A mixture of 9.5 g. (0.1 mole) of 2,5-dimethylpyrrole and a suspension of 7 g. (0.1 mole) of potassium cyanide in 9 ml. of water and 18 ml. of acetone was stirred vigorously with external cooling and neutralized first with about 10 ml. of concentrated hydrochloric acid and then acidified with an additional 3 ml. of concentrated hydrochloric acid. The mixture was then heated at 50°C. for 5 hours and poured into 500 ml. of water. The solid gummy material which separated was collected, washed with water, then taken into diethyl ether, and the organic solution washed with water, them sodium bicarbonate, then brine, dried and taken to dryness to give a solid material, which was recrystallized from cyclohexane to give two crops totaling 5.0 g. of 3,3,3'3',4,4',6,6'-octamethyl-1,1'-spirobis(cyclopenta[4,5-c]pyrrole), m.p. 184°–190°C. and 183°–188°C.

The latter (2.2 g., 0.007 mole), together with 0.83 g. (0.014 mole) of acetone, 1.1 g. (0.014 mole) of ammonium acetate and 1.9 g. (0.028 mole) of potassium cyanide in 10 ml. of glacial acetic acid was heated under reflux under a nitrogen atmosphere for 18 hours. The mixture was then poured into water, and the solid which separated was dissolved in diethyl ether, washed first with water, then with sodium bicarbonate, then with saturated brine, dried and the solution taken to dryness. The residual solid was triturated with cyclohexane to give 2.1 g. of 2,4,5,6-tetrahydro-1,3,4,6,6-pentamethylcyclopenta[c]pyrrole-4-carbonitrile, m.p. 146°–150°C., identical with the material described above in Example 2.

EXAMPLE 62

A mixture of 25 g. (0.44 mole) of cyclopropylamine, 50 g. (0.44 mole) of 2,5-hexanedione and 0.5 g. of p-toluenesulfonic acid monohydrate in 300 ml. of benzene was heated under a Dean-Stark trap using the procedure described above in Example 4. There was thus obtained 52.8 g. of 1-cyclopropyl-2,5-dimethylpyrrole, b.p. 36°–39°C./0.3 mm.

A mixture of 27.4 g. (0.2 mole) of the latter, 25.2 g. (0.24 mole) of 2-amino-2-methylpropionitrile and 22.2 ml. of trifluroacetic acid in 200 ml. of glacial acetic acid was heated under reflux and then worked up using the procedure described above in Example 11. The crude product thus obtained was recrystallized from isopropanol to give 24.7 g. of 2-cyclopropyl-2,4,5,6-tetrahydro-1,3,4,6,6-pentamethylcyclopenta[c]pyrrole-4-carbonitrile.

The latter (12.1 g., 0.05 mole) was hydrolyzed in 130 ml. of 90% sulfuric acid using the procedure described above in Example 1. There was thus obtained 10.1 g. of 2-cyclopropyl-2,4,5,6-tetrahydro-1,3,4,6,6-pentamethylcyclopenta[c]pyrrole-4-carboxamide, m.p. 188°–192°C.

EXAMPLE 63

A mixture of 57.1 g. (0.5 mole) of 2,5-hexanedione, 42.6 g. (0.5 mole) cyclopentylamine and 0.5 g. of p-toluenesulfonic acid monohydrate in 300 ml. of benzene was refluxed under a water separator using the procedure described above in Example 4. There was thus obtained 66.7 g. of 1-cyclopentyl-2,5-dimethylpyrrole, b.p. 63°–72°C./0.03 mm., $n_D^{25}$ 1.5210.

A mixture of 32.8 g. (0.20 mole) of the latter, 43.2 g. (0.44 mole) of 2-amino-2-methylpropionitrile and 32 ml. of trifluoroacetic acid in 160 ml. of glacial acetic acid was heated under reflux and then worked up in the manner described above in Example 11. The crude product thus obtained was recrystallized from dilute aqueous isopropanol to give 38.2 g. of 2-cyclopentyl-2,4,5,6-tetrahydro-1,3,4,6,6-pentamethylcyclopenta[c]pyrrole-4-carbonitrile, m.p. 98°–102°C.

The latter (6.9., g., 0.025 mole) was hydrolyzed in 55 ml. of 90% sulfuric acid using the procedure described above in Example 1. The crude product was recrystallized from cyclohexane to give 4.6 g. of 2-cyclopentyl-2,4,5,6-tetrahydro-1,3,4,6,6-pentamethylcyclopenta[c]pyrrole-4-carboxamide, m.p. 152°–155°C.

EXAMPLE 64

A mixture of 46.3 g. (0.41 mole) of 2,5-hexanedione, 35.8 g. (0.41 mole) of 2-dimethylaminoethylamine and 0.5 g. of p-toluenesulfonic acid monohydrate in 300 ml. of benzene was refluxed under a water separator using the procedure described above in Example 4. There was thus obtained 58.5 g. of 1-(2-dimethylaminoethyl)-2,5-dimethylpyrrole, b.p. 48°C./0.03 mm., $n_D^{25}$ 1.4922.

A mixture of 8.4 g. (0.05 mole) of the latter, 10.9 g. (0.11 mole) of 2-amino-2-methylpropionitrile and 11.9 ml. of trifluoroacetic acid in 50 ml. of glacial acetic acid was heated under reflux and then worked up using the procedure described above in Example 11. The product was distilled in vacuo to give 1.3 g. of 1-(2-dimethylaminoethyl)-2,4,5,6-tetrahydro-1,3,4,6,6-pentamethylcyclopenta[c]pyrrole-4-carbonitrile, b.p. 115°C./0.03 mm., $n_D^{25}$ 1.5095.

The latter (1.9 g., 0.007 mole) was hydrolyzed in 20 ml. of 90% sulfuric acid using the procedure described above in Example 4. The product was recrystallized from heptane/hexane to give 0.5 g. of 1-(2-dimethylaminoethyl)-2,4,5,6-tetrahydro-1,3,4,6,6-pentamethylcyclopenta[c]pyrrole-4-carboxamide, m.p.

EXAMPLE 65

A mixture of 22.8 g. (0.20 mole) of 2,5-hexanedione, 26.0 g. (0.20 mole) of 2-morpholinoethylamine and 0.25 g. of p-toluenesulfonic acid monohydrate in 200 ml. of benzene was refluxed under a water separator and then worked up using the procedure described above in Example 4. There was thus obtained 37.6 g. of 1-(2-morpholinoethyl)-2,5-dimethylpyrrole, b.p. 89°–104°C./0.05 mm., $n_D^{25}$ 1.5167.

A mixture of 20.8 g. (0.1 mole) of the latter, 25 g. (0.3 mole) of 2-amino-2-methylpropionitrile and 22.2 ml. of trifluoroacetic acid in 200 ml. of glacial acetic acid was heated under reflux and then worked up using the procedure described above in Example 11. The product was recrystallized from hexane to give 9.4 g. of 2-(2-morpholinoethyl)-2,4,5,6-tetrahydro-1,3,4,6,6-pentamethylcyclopenta[c]pyrrole-4-carbonitrile, m.p. 103°–105°C.

The latter (9.8 g., 0.03 mole) was hydrolyzed in 40 ml. of 90% sulfuric acid using the procedure described above in Example 1. The product was recrystallized from hexane to give 8.6 g. of 2-(2-morpholinoethyl)-2,4,5,6-tetrahydro-1,3,4,6,6-pentamethylcyclopenta[c.pyrrole-4-carboxamide, m.p. 142°–144°C.

EXAMPLE 66

A mixture of 34.2 g. (0.3 mole) of 2,5-hexanedione, 22.5 g. (0.3 mole) of 3-aminopropanol and 0.4 g. of p-toluenesulfonic acid in 250 ml. of benzene was refluxed under a water separator and then worked up using the procedure described above in Example 4. There was thus obtained 38.5 g. of 1-(3-hydroxypropyl)-2,5-dimethylpyrrole, b.p. 83°–96°C./0.05 mm.

A mixture of 30.6 g. (0.20 mole) of the latter, 46.0 g. (0.44 mole) of 2-amino-2-methylpropionitrile and 32.6 ml. of trifluoroacetic acid in 150 ml. of glacial acetic acid was refluxed for 4 hours and then worked up using the procedure described above in Example 11. The product was recrystallized several times from cyclohexane, then chromatographed on silica gel using 5% diethyl ether/pentane, and finally recrystallized again from pentane to give 1.8 g. of 2-(3-hydroxypropyl)-2,4,5,-tetrahydro-1,3,4,6,6-pentamethylcyclopenta[c]pyrrole-4-carbonitrile, m.p. 100°–101°C.

The latter (2.6 g., 0.001 mole) was hydrolyzed in 12 ml. of 90% sulfuric acid using the procedure described above in Example 1. There was thus obtained 2-(3-hydroxypropyl-2,4,5,6-tetrahydro-1,3,4,6,6-pentamethylcyclopental[c]pyrrole-4-carboxamide.

EXAMPLE 67

A mixture of 21.2 g. (0.19 mole) of 2,5-hexanedione, 20.0 g. (0.19 mole) of cyclobutylamine hydrochloride and 1 g. of p-toluenesulfonic acid in 200 ml. of benzene was heated under a water separator and then worked up using the procedure described above in Example 4. The product was distilled in vacuo to give 18.2 g. of 1-cyclobutyl-2,5-dimethylpyrrole, b.p. 50°–55°C./0.2 mm., $n_D^{25}$ 1.5202.

The latter (18.2 g., 0.12 mole) was reacted with 27.5 g. (0.27 mole) of 2-amino-2-methylpropionitrile and 17.9 ml. of trifluoroacetic acid in 100 ml. of glacial acetic acid using the procedure described above in Example 11. There was thus obtained 9.5 g. of 2-cyclobutyl-2,4,5,6-tetrahydro-1,3,4,6,6-pentamethylcyclopenta[c]pyrrole-4-carbonitrile, m.p. 95°–98°C.

The latter (9.3 g., 0.037 mole) was hydrolyzed in 45 ml. of 90% sulfuric acid using the procedure described above in Example 1. There was thus obtained 5.5 g. of 2-cyclobutyl-2,4,5,6-tetrahydro-1,3,4,6,6-pentamethylcyclopenta[c]Pyrrole-4-carboxamide, m.p. 149°–152°C.

EXAMPLE 68

Reaction of 2,5-hexanedione with cyclohexylmethylamine in the presence of p-toluenesulfonic acid in benzene solution under a water separator; reaction of the resulting 1-cyclohexylmethyl-2,5-dimethylpyrrole with 2-amino-2-methylpropionitrile in the presence of trifluoroacetic acid in glacial acetic acid; and hydrolysis with dilute sulfuric acid of the resulting 2-cyclohexylmethyl-2,4,5,6-tetrahydro-1,3,4,6,6-pentamethylcyclopenta[c]pyrrole-4-carbonitrile, all according to the procedure described above in Example 42, affords 2-cyclohexylmethyl-2,4,5,6-tetrahydro-1,3,4,6,6-pentamethylcyclopenta[c]pyrrole-4-carboxamide.

EXAMPLE 69

Reaction of 2,5-hexanedione with 2-(1-pyrrolidyl)ethylamine in benzene in the presence of p-toluenesulfonic acid under a water separator; reaction of the resulting 1-[2-(1-pyrrolidyl)ethyl]-2,5-dimethylpyrrole with 2-amino-2-methylpropionitrile in the presence of trifluoroacetic acid in glacial acetic acid; and hydrolysis with dilute sulfuric acid of the resulting 2-[2-(1-pyrrolidyl)ethyl]-2,4,5,6-tetrahydro-1,3,4,6,6-pentamethylcyclopenta[c]pyrrole-4-carbonitrile, all according to the procedure described above in Example 42, affords 2-[2-(-1-pyrrolidyl)ethyl]-2,4,5,6-tetrahydro-1,3,4,6,6-pentamethylcyclopenta[c]pyrrole-4-carboxamide.

EXAMPLE 70

Reaction of 2,5-hexanedione with 2-(1-piperidyl)ethylamine in benzene in the presence of p-toluenesulfonic acid under a water separator; reaction of the resulting 1-[2-(1-piperidyl)ethyl]-2,5-dimethylpyrrole with 2-amino-2-methylpropionitrile in the presence of trifluoroacetic acid in glacial acetic acid; and hydrolysis with dilute sulfuric acid of the resulting 2-[2-(1-piperidyl)ethyl]-2,4,5,6-tetrahydro-1,3,4,6,6-pentamethylcyclopenta[c]pyrrole-4-carbonitrile, all according to the procedure described above in Example 42, affords 2-[2-(-1-piperidyl)ethyl]-2,4,5,6-tetrahydro-1,3,4,6,6-pentamethylcyclopenta[c]pyrrole-4-carboxamide.

EXAMPLE 71

Reaction of the 3-(1,2,5-trimethylpyrrole)propionitrile described above in Example 59 with sodium hydride in diethyl ether, isolation of the product from a slightly acid medium and heating the resulting 3-(1,2,5-trimethyl-3-pyrrole)-1-iminopropane in glacial acetic acid in the presence of ammonium acetate and potassium cyanide using the procedure described above in Example 58 affords 2,4,5,6-tetrahydro-1,2,3-trimethylcyclopenta[c]pyrrole-4-carbonitrile which, on hydrolysis with dilute sulfuric acid using the procedure described above in Example 1, affords 2,4,5,6-tetrahydro-1,2,3-trimethylcyclopenta[c]pyrrole-4-carboxamide.

EXAMPLE 72

Reaction of the 2-(2-cyanoethyl)-2,4,5,6-tetrahydro-1,3,4,6,6-pentamethylcyclopenta[c]pyrrole-4-carbonitrile described above in Example 39 in an autoclave at 150°–160°C. with an ethanol solution saturated with anhydrous ammonia and anhydrous hydrogen sulfide affords 2-(2-thiocarboxamidoethyl-2,4,5,6-tetrahydro-1,3,4,6,6-pentamethylcyclopenta[c]pyrrole-4-thiocarboxamide.

EXAMPLE 73

A 2.53 g. (0.06 mole) portion of a 57% dispersion of sodium hydride in mineral oil was washed free of mineral oil by slurrying and decantation with hexane, and was then slurried in 40 ml. of dimethylsulfoxide. To the mixture was added a solution of 8.8 g. (0.04 mole) of 2,4,5,6-tetrahydro-1,3,4,6,6-pentamethylcyclopenta[c]pyrrole-4-carboxamide (described above in Example 2), and the mixture was stirred at room temperature for one hour. The mixture was then treated with 8.1 g. (0.06 mole) of cyclopropylmethyl bromide, stirred at room temperature overnight, poured into water, and the mixture extracted with diethyl ether. The ether extracts, on drying and evaporation to dryness, afforded a brown oil which was chromatographed on silica gel using a 3% isopropanol in ether solution as eluent. There was thus obtained a crystalline material which was slurried with ether/pentane to give 0.55 g. of 2-cyclopropylmethyl-2,4,5,6-tetrahydro-1,3,4,6,6-pentamethylcyclopenta[c]pyrrole-4-carboxamide, m.p. 145°–148°C.

The same compound was prepared by reaction of 40.4 g. (0.2 mole) of 2,4,5,6-tetrahydro-1,3,4,6,6-pentamethylcyclopenta[c]pyrrole-4-carbonitrile in 400 ml. of dimethylsulfoxide with 9.3 g. (0.22 mole) of a 57% dispersion of sodium hydride in mineral oil, reaction of the resulting sodium salt with 29.7 g. (0.22 mole) of cyclopropylmethyl bromide using the procedure described above in Example 3, and hydrolysis of the resulting 2-cyclopropylmethyl-2,4,5,6-tetrahydro-1,3,4,6,6-pentamethylcyclopenta[c]pyrrole-4-carbonitrile (25.0 g., m.p. 90°–92°C.) with phosphoric acid using the procedure described above in Example 1. The crude material thus obtained was recrystallized from ethanol/water to give 10.9 g. of the carboxamide, m.p. 150°–153°C.

EXAMPLE 74

A solution of 3.05 g. (0.01 mole) of 2[3-(dimethylaminopropyl]-2,4,5,6-tetrahydro-1,3,4,6,6-pentamethylcyclopenta[c]pyrrole-4-carboxamide (described above in Example 3) in 30 ml. of isopropanol was treated with 2.1 g. of methyl iodide, and the mixture was allowed to stand at room temperature overnight. The material which had separated was then collected, washed with isopropanol and pentane and dried to give 4.5 g. of 2-[3-dimethylamino)propyl]-2,4,5,6-tetrahydro-1,3,4,6,6-pentamethylcyclopenta[c]pyrrole-4-carboxamide methiodide, m.p. 128°–130°C.

A solution of 10.2 g. (0.06 mole) of silver nitrate in 102 ml. of hot water was treated with a solution of 2.34 g. of sodium hydroxide in 24 ml. of hot water. The resulting precipitate was washed five times by decantation with hot water, then filtered, and the solid added to a solution of about 9 g. (0.02 mole) of 2-[3-(dimethylamino)propyl]-2,4,5,6-tetrahydro-1,3,4,6,6-pentamethylcyclopenta[c]pyrrole-4-carboxamide methiodide in 60 ml. of water. The mixture was stirred at room temperature overnight, then filtered, the filter washed first with hot water and then with ethanol, the aqueous and the ethanol filtrates being set aside separately for further work. The ethanol washings were refiltered, evaporated to dryness, and the solid residue which slowly crystallized was set aside and combined with organic material obtained by evaporation to dryness of the aqueous filtrate, heating the solid residue on a steam bath for 3 hours under a vacuum pump, extraction of the residue with ethyl acetate and evaporation to dryness of the extracts. The combined material obtained from the aqueous and ethanol washings was recrystallized from ethyl acetate/pentane to give two crops totaling 0.7 g. of 2-allyl-2,4,5,6-tetrahydro-1,3,4,6,6-pentamethylcyclopenta[c]pyrrole-4-carboxamide, m.p. 96°–98°C.

EXAMPLE 75

A mixture of 20 g. (0.066 mole) of 2-phenyl-2,4,5,6-tetrahydro-1,3-diformyl-4,6,6-trimethylcyclopenta[c]pyrrole-4-carbonitrile (described above in Example 44), 200 ml. of diethylene glycol monoethyl ether and 2.5 g. of 10% palladium-on-charcoal was refluxed under nitrogen with stirring for 24 hours, then cooled, diluted with methanol to 400 ml. and filtered. The filtrate was taken to dryness, and the residue diluted with water and extracted with ethyl acetate. The ethyl acetate layer was separated, washed four times with water, once with brine, dried, and taken to dryness to give 20.5 g. of a slightly gummy material, which was recrystallized from isopropanol to give 6.5 g. of 2-phenyl-2,4,5,6-tetrahydro-4,6,6-trimethylcyclopenta[c]pyrrole-4-carbonitrile, m.p. 139°–141°C.

The latter (500 mg., 0.002 mole) was hydrolyzed in 50 ml. of 90% sulfuric acid using the procedure described above in Example 1. There was thus obtained 500 mg. of 2-phenyl-2,4,5,6-tetrahydro-4,6,6-trimethylcyclopenta[c]pyrrole-4-carboxamide, m.p. 192°–194°C. (recrystallized from methanol).

EXAMPLE 76

Reaction of 2,5-hexanedione with 2-aminothiophene in benzene in the presence of an acid catalyst; reaction of the resulting 1-(2-thienyl)-2,5-dimethylpyrrole with 2-amino-2-methylpropionitrile and trifluoroacetic acid; and hydrolysis of the resulting 2-(2-thienyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(2-thienyl)-2,4,5,6-tetrahydro-1,3,4,6,6-pentamethylcyclopenta[c]pyrrole-4-carboxamide.

EXAMPLE 77

A mixture of 114 g. (1.0 mole) of 2,5-hexanedione, 137 g. (1.0 mole) of 4-aminobenzoic acid and a small amount of p-toluenesulfonic acid in 600 ml. of benzene was heated under reflux using a Dean-Stark trap, and when reaction was complete, the mixture was worked up in the manner described above in Example 13 to give 106 g. of 1-(4-carboxyphenyl)-2,5-dimethylpyrrole, m.p. 202°–204°C.

The latter, on reaction with 2-amino-2-methylpropionitrile and trifluoroacetic acid; and hydrolysis of the resulting 2-(4-carboxyphenyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(4-carboxyphenyl)-2,4,5,6-tetrahydro-1,3,4,6,6-pentamethylcyclopenta[c]pyrrole-4-carboxamide.

EXAMPLE 78

Reaction of the 2-(4-carboxyphenyl)-2,4,5,6-tetrahydro-1,3,4,6,6-pentamethylcyclopenta[c]pyrrole-4-carboxamide with methanol in the presence of a small amount of a mineral acid affords 2-(4-carbomethoxyphenyl)-2,4,5,6-tetrahydro-1,3,4,6,6-pentamethylcyclopenta[c]pyrrole-4-carboxamide.

EXAMPLE 79

Reaction of 2,5-hexanedione with 3-aminobenzamide in benzene in the presence of an acid catalyst; reaction of the resulting 1-(3-carboxamidophenyl)-2,5-dimethylpyrrole with 2-amino-2-methylpropionitrile and trifluoroacetic acid; and hydrolysis of the resulting 2-(3-carboxamidophenyl)-2,4,5,6-tetrahydro-1,3,4,6,6-pentamethylcyclopenta[c]pyrrole-4-carbonitrile with dilute sulfuric acid all according to the procedure described above in Example 13, affords 2-(3-carboxamidophenyl)-2,4,5,6-tetrahydro-1,3,4,6,6-pentamethylcyclopenta[c]pyrrole-4-carboxamide.

EXAMPLE 80

Reaction of 2,5-hexanedione with 3-methylmercaptoaniline in benzene in the presence of an acid catalyst; reaction of the resulting 1-(3-methylmercaptophenyl)-2,5-dimethylpyrrole with 2-amino-2-methylpropionitrile and trifluoroacetic acid; and hydrolysis of the resulting 2-(3-methylmercaptophenyl)-2,4,5,6-tetrahydro-1,3,4,6,6-pentamethylcyclopenta[c]pyrrole-4-carbonitrile with dilute sulfuric acid, all according to the procedure described above in Example 13, affords 2-(3-methylmercaptophenyl)-2,4,5,6-tetrahydro-1,3,4,6,6-pentamethylcyclopenta[c]pyrrole-4-carboxamide.

EXAMPLE 81

Reaction of the 2-(3-methylmercaptophenyl)-2,4,5,6-tetrahydro-1,3,4,6,6-pentamethylcyclopenta[c]pyrrole-4-carboxamide with one molar equivalent of performic acid in acetone at room temperature affords 2-(3-methylsulfinylphenyl)-2,4,5,6-tetrahydro-1,3,4,6,6-pentamethylcyclopenta[c]pyrrole-4-carboxamide.

EXAMPLE 82

Reaction of 2-(3-methylmercaptophenyl)-2,4,5,6-tetrahydro-1,3,4,6,6-pentamethylcyclopenta[c]pyrrole-4-carboxamide with 2-molar equivalents of performic acid in acetone at room temperature affords 2-(3-methylsulfonylphenyl)-2,4,5,6-tetrahydro-1,3,4,6,6-pentamethylcyclopenta[c]pyrrole-4-carboxamide.

EXAMPLE 83

A mixture of 114 g. (1.0 mole) of 2,5-hexanedione, 130 g. (1.0 mole) of p-nitroaniline and a small amount of p-toluenesulfonic acid in 600 ml. of benzene was refluxed under a water separator using the procedure described above in Example 13. There was thus obtained 103 g. of 1-(4-nitrophenyl)-2,5-dimethylpyrrole, m.p. 146°–149°C.

A mixture of 20.8 g. (0.1 mole) of 1-(4-nitrophenyl-2,5-dimethylpyrrole, 18.5 g. (0.22 mole) of 2-amino-2-methylpropionitrile and 16.5 ml. of trifluoroacetic acid in 150 ml. of glacial acetic acid was refluxed for twenty hours under a nitrogen atmosphere, then poured into water, and the mixture worked up in the manner described above in Example 11. There was thus obtained 12.5 g. of 2-(4-nitrophenyl)-2,4,5,6-tetrahydro-1,3,4,6,6-pentamethylcyclopenta[c]pyrrole-4-carbonitrile, m.p. 206°–208.5°C.

The latter, on hydrolysis with dilute sulfuric acid using the procedure described above in Example 1 affords 2-(4-nitrophenyl)-2,4,5,6-tetrahydro-1,3,4,6,6-ppentamethylcyclopenta[c]pyrrole-4-carbonitrile.

EXAMPLE 84

Reaction of 1,6-diphenylhexane-2,5-dione [Schwetlick et al., J. Prakt. Chem. 25 (1–2), 95–100 (1964)] with aniline in benzene in the presence of an acid catalyst; reaction of the resulting 1-phenyl-2,5-bisbenzylpyrrole with 2-amino-2-methylpropionitrile and trifluoroacetic acid; and hydrolysis of the resulting 1,3-bisbenzyl-2-phenyl-2,4,5,6-tetrahydro-4,6,6-trimethylcyclopenta[c]pyrrole-4-carbonitrile with dilute sulfuric acid, all according to the procedure described above in Example 13, affords 1,3-bisbenzyl-2-phenyl-2,4,5,6-tetrahydro-4,6,6-trimethylcyclopenta[c]pyrrole-4-carboxamide.

EXAMPLE 85

Reaction of the 2-phenyl-2,4,5,6-tetrahydro-1,3-diformyl-4,6,6-trimethylcyclopenta[c]pyrrole-4-carboxamide described above in Example 44 with two molar equivalents of perbenzoic acid in acetone at room temperature affords 2-phenyl-2,4,5,6-tetrahydro-4,6,6-trimethylcyclopenta[c]pyrrole-4-carboxamido-1,3-dicarboxylic acid.

EXAMPLE 86

Reaction of the 2-phenyl-2,4,5,6-tetrahydro-4,6,6-trimethylcyclopenta[c]pyrrole-4-carboxamido-1,3-dicarboxylic acid described above in Example 85 with methanol in the presence of a small amount of a mineral acid affords dimethyl-2-phenyl-2,4,5,6-tetrahydro-4,6,6-trimethylcyclopenta[c]pyrrole-4-carboxamido-1,3-dicarboxylate.

EXAMPLE 87

To a suspension of 1.025 g. of 2-phenyl-2,4,5,6-tetrahydro-1,3-diformyl-4,6,6-trimethylcyclopenta[c]pyrrole-4-carboxamide (described above in Example 44) in 10 ml. of ethanol was added with stirring a suspension of 250 mg. of sodium borohydride in ethanol, and the resulting clear solution was allowed to stand at room temperature for 2 hours. The white crystalline solid which separated was collected, washed with water and dried to give 645 mg. of product. This material was combined with that obtained by evaporation to dryness of the filtrate from the main product and trituration with water and collection and drying of the residual solid. There was thus obtained an additional 344 mg. of 2-phenyl-2,4,5,6-tetrahydro-1,3-bishydroxymethyl-4,6,6-trimethylcyclopenta[c]pyrrole-4-carboxamide ethanolate, m.p. 115°–120°C.

We claim:

1. A compound having the formula

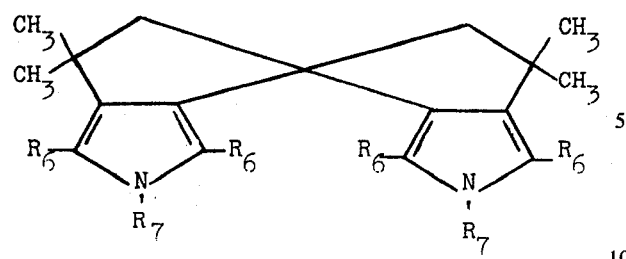

where each $R_6$ group is the same lower-alkyl; and $R_7$ is hydrogen, lower-alkyl, cycloalkyl or cycloalkyl-lower-alkyl containing from three to six ring carbon atoms and having a total of five to ten carbon atoms, phenyl, or phenyl substituted in the phenyl nucleus by a single member of the group consisting of lower-alkyl, lower-alkoxy, halogen, hydroxy, methylenedioxy, trifluoromethyl, lower-alkanoylamino, amino, di-lower-alkylamino, or sulfamoyl.

2. 3,3,3',3',4,4',6,6'-Octamethyl-5,5'-diphenyl-1,1'-spirobis(cyclopenta[4,5-c]pyrrole) according to claim 1.

3. 3,3,3',3',4,4',6,6'-Octamethyl-1,1'-spirobis(cyclopenta[4,5-c]pyrrole) according to claim 1.

\* \* \* \* \*